United States Patent
Yan et al.

(10) Patent No.: US 11,936,572 B2
(45) Date of Patent: Mar. 19, 2024

(54) COMMUNICATION METHOD FOR CARRIER AGGREGATION SYSTEM, TERMINAL, AND NETWORK DEVICE

(71) Applicant: Huawei Technologies Co., Ltd., Shenzhen (CN)

(72) Inventors: Chaoyi Yan, Dongguan (CN); Zezhou Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 17/349,524

(22) Filed: Jun. 16, 2021

(65) Prior Publication Data

US 2021/0314110 A1    Oct. 7, 2021

Related U.S. Application Data

(63) Continuation of application No. PCT/CN2019/121514, filed on Nov. 28, 2019.

(30) Foreign Application Priority Data

Dec. 17, 2018    (CN) .......................... 201811544898.3

(51) Int. Cl.
*H04W 4/00*    (2018.01)
*H04L 5/00*    (2006.01)
(Continued)

(52) U.S. Cl.
CPC ......... *H04L 5/001* (2013.01); *H04W 72/0446* (2013.01); *H04W 72/0453* (2013.01); *H04W 72/21* (2023.01); *H04W 72/23* (2023.01)

(58) Field of Classification Search
CPC ..... H04L 5/001; H04L 1/1854; H04L 1/1861; H04L 5/0094; H04L 5/0007;
(Continued)

(56) References Cited

U.S. PATENT DOCUMENTS 10,334,574 B2 * 6/2019 Si ........................... H04W 72/23
10,425,205 B2 * 9/2019 Hosseini ............... H04L 5/0092
(Continued)

FOREIGN PATENT DOCUMENTS

CN    103384188 A    11/2013
CN    103718498 A    4/2014
(Continued)

OTHER PUBLICATIONS

ZTE, ZTE Microelectronics, "Latency Reduction Solutions for TDD [online]," 3GPP TSG RAN WG1 Meeting #85, Nanjing, China, R1-164638, Total 9 pages, 3rd Generation Partnership Project, Valbonne, France (May 23-27, 2016).
(Continued)

*Primary Examiner* — Stephen M D Agosta
(74) *Attorney, Agent, or Firm* — Leydig, Voit & Mayer, Ltd.

(57) ABSTRACT

A carrier aggregation system includes a TDD carrier and an FDD carrier, and a method for the carrier aggregation system includes: a terminal device receives downlink information by using a secondary component carrier; and the terminal device sends feedback information for the downlink information by using a primary component carrier. When the primary component carrier or the secondary component carrier is a TDD carrier, at least one first subframe that includes P consecutive sTTIs exists in the TDD carrier, and at least one sTTI that occupies two OFDM symbols exists in the P consecutive sTTIs, where P is an integer greater than 1. Embodiments of the present disclosure further provide a corresponding terminal device and network device.

16 Claims, 11 Drawing Sheets

(51) Int. Cl.
*H04W 72/0446* (2023.01)
*H04W 72/0453* (2023.01)
*H04W 72/21* (2023.01)
*H04W 72/23* (2023.01)

(58) Field of Classification Search
CPC ... H04L 5/0055; H04L 5/0078; H04L 5/1469; H04L 5/0053; H04L 5/14; H04L 27/2602; H04W 72/0446; H04W 72/0453; H04W 72/21; H04W 72/23
See application file for complete search history.

(56) References Cited

U.S. PATENT DOCUMENTS

| | | | | |
|---|---|---|---|---|
| 10,841,907 | B2* | 11/2020 | Gao | H04L 5/0055 |
| 10,980,047 | B2* | 4/2021 | Takeda | H04W 72/23 |
| 2017/0013618 | A1* | 1/2017 | Shin | H04L 5/001 |
| 2017/0099127 | A1* | 4/2017 | Byun | H04L 5/0053 |
| 2017/0142704 | A1* | 5/2017 | Jung | H04L 5/001 |
| 2017/0171842 | A1* | 6/2017 | You | H04L 5/0082 |
| 2017/0223702 | A1* | 8/2017 | Yin | H04L 1/1854 |
| 2017/0317794 | A1* | 11/2017 | You | H04L 5/0051 |
| 2017/0331596 | A1* | 11/2017 | Guan | H04W 72/21 |
| 2017/0338988 | A1* | 11/2017 | Yin | H04L 5/0092 |
| 2018/0049226 | A1* | 2/2018 | Chen | H04L 1/1861 |
| 2018/0124711 | A1* | 5/2018 | Hosseini | H04W 52/346 |
| 2018/0183552 | A1* | 6/2018 | Hosseini | H04L 27/2613 |
| 2018/0206258 | A1* | 7/2018 | Hosseini | H04W 72/52 |
| 2018/0242347 | A1* | 8/2018 | Sahlin | H04W 72/0446 |
| 2018/0295608 | A1* | 10/2018 | Nguyen | H04L 5/001 |
| 2019/0182011 | A1* | 6/2019 | Li | H04L 5/0055 |
| 2019/0199481 | A1* | 6/2019 | Hosseini | H04L 1/1854 |
| 2019/0229879 | A1* | 7/2019 | Yi | H04W 24/08 |
| 2019/0274154 | A1* | 9/2019 | Shi | H04L 27/2655 |
| 2019/0274159 | A1* | 9/2019 | Lunttila | H04L 5/0053 |
| 2019/0297572 | A1* | 9/2019 | Rahman | H04W 72/1268 |
| 2020/0229152 | A1* | 7/2020 | Park | H04L 5/0094 |
| 2020/0235898 | A1* | 7/2020 | Loehr | H04W 80/02 |
| 2020/0305129 | A1* | 9/2020 | Lee | H04W 72/0446 |
| 2020/0337083 | A1* | 10/2020 | Loehr | H04W 72/1263 |
| 2020/0351409 | A1* | 11/2020 | Karampatsis | H04W 76/30 |
| 2020/0396024 | A1* | 12/2020 | Ganesan | H04L 1/1896 |
| 2021/0376980 | A1* | 12/2021 | Hosseini | H04L 5/0082 |

FOREIGN PATENT DOCUMENTS

| | | |
|---|---|---|
| CN | 104811411 A | 7/2015 |
| CN | 105207757 A | 12/2015 |
| CN | 105379352 A | 3/2016 |
| CN | 106712912 A | 5/2017 |
| CN | 107210884 A | 9/2017 |
| CN | 107294897 A | 10/2017 |
| CN | 107567085 A | 1/2018 |
| JP | 2021507631 A | 2/2021 |
| WO | 2017130991 A1 | 8/2017 |
| WO | 2017132454 A1 | 8/2017 |
| WO | 2018172136 A1 | 9/2018 |
| WO | 2019126571 A1 | 6/2019 |

OTHER PUBLICATIONS

Ericsson, "PCMAX definition for UL CA with different TTI patterns across carriers [online]," 3GPP TSG-RAN WG4 #83, Hangzhou, China, R4-1705092, Total 6 pages, 3rd Generation Partnership Project, Valbonne, France (May 15-19, 2017).

"Corrections on bandwidth part and CA," 3GPP TSG RAN WG1 Meeting #95, Spokane, USA, R1-1812183, Total 7 pages, 3rd Generation Partnership Project, Valbonne, France (Nov. 12-16, 2018).

"HARQ and scheduling timing design for LTE sTTI," 3GPP TSG RAN WG1 Meeting #89, Hangzhou, P.R. China, R1-1707446, Total 5 pages, 3rd Generation Partnership Project, Valbonne, France (May 15-19, 2017).

* cited by examiner

COMMUNICATION METHOD FOR CARRIER AGGREGATION SYSTEM, TERMINAL, AND NETWORK DEVICE

CROSS-REFERENCE TO RELATED APPLICATIONS

This application is a continuation of International Application No. PCT/CN2019/121514, filed on Nov. 28, 2019, which claims priority to Chinese Patent Application No. 201811544898.3, filed on Dec. 17, 2018. The disclosures of the aforementioned applications are incorporated herein by reference in their entirety.

FIELD

This application relates to the field of communication technologies, and specifically, to a communication method for a carrier aggregation system, a terminal, and a network device.

BACKGROUND

With development and change of mobile communication service requirements, a plurality of organizations such as the international telecommunication union define a higher requirement on user plane delay performance of a future mobile communication system. One of main methods to shorten the user delay performance is to reduce a transmission time interval (TTI), that is, to use a short transmission time interval (sTTI). For a downlink link in which sTTIs are used, both a quantity of sTTIs included in a length (1 ms) of one subframe and a quantity of orthogonal frequency division multiplexing (OFDM) symbols occupied by each sTTI need to be redesigned.

According to sTTI standard specifications specified in 3GPP Rel-15, shortening adjustment is performed on a scheduling TTI that is in a long term evolution (LTE) system and whose original length is 1 ms, namely, one subframe. Specifically, a scheduling TTI in a frequency division duplex (FDD) system is shortened from 1 ms to a minimum sTTI in which two OFDM symbols may be used and whose length is about 0.14 ms; and a scheduling TTI in a time division duplex (TDD) system is shortened from 1 ms to seven OFDM symbols that are used as a minimum schedulable sTTI and whose length is 0.5 ms. A quantity of symbols occupied by an sTTI of a conventional subframe (1 ms) of an existing FDD carrier may be 2 or 3, and sTTI division of a downlink conventional subframe of the existing FDD carrier has two patterns, where a pattern 1 {3,2,2,2,2,3} is used in a case in which a conventional control area occupies one or three OFDM symbols, and a pattern 2 {2,3,2,2,2,3} is used in a case in which a conventional control area occupies two OFDM symbols.

In a carrier aggregation system of FDD and TDD, when the FDD is used as a primary component carrier and the TDD is used as a secondary component carrier, a downlink feedback of the TDD is carried on an FDD carrier. According to the standard specifications in 3rd generation partnership project (3GPP) Release-15, if an FDD carrier uses two OFDM symbols or three OFDM symbols as an sTTI division pattern of a subframe, and a TDD carrier uses seven OFDM symbols an sTTI division pattern of a subframe, the FDD carrier can generate one uplink feedback opportunity every two OFDM symbols and every three OFDM symbols, but a minimum downlink sTTI of the TDD carrier is seven OFDM symbols. As a result, not all feedback opportunities of the FDD uplink carrier can be fully used, and a feedback bottleneck exists. When the TDD carrier is used as a primary component carrier, a downlink feedback of the FDD carrier is carried on the TDD carrier. According to the standard specifications in 3GPP Rel-15, for a case in which the FDD carrier uses two OFDM symbols or three OFDM symbols as the sTTI division pattern of the subframe, and the TDD carrier uses seven OFDM symbols as the sTTI division pattern of the subframe, a terminal may generate one piece of feedback information every two OFDM symbols and every three OFDM symbols when receiving the FDD carrier, but each uplink subframe of the TDD can provide only two feedback opportunities. As a result, a feedback bottleneck exists. Therefore, regardless of the foregoing cases, the existence of the feedback bottleneck causes a feedback information transmission delay.

SUMMARY

Embodiments of this application provide a communication method for a carrier aggregation system, to avoid a feedback bottleneck in the TDD-FDD carrier aggregation system to some extent and reduce an air interface delay. The embodiments of this application further provide a corresponding device.

A first aspect of this application provides a communication method for a carrier aggregation system. The carrier aggregation system is a carrier aggregation system including a time division duplex TDD carrier and a frequency division duplex FDD carrier. The method includes: A terminal device receives downlink information by using a secondary component carrier, where the downlink information may be information such as a downlink shared physical channel scheduled by a physical downlink control channel. The terminal device sends feedback information for the downlink information by using a primary component carrier, where the feedback information may be a hybrid automatic repeat request message, or the like. When the primary component carrier or the secondary component carrier is the TDD carrier, at least one first subframe exists in the TDD carrier. Usually, one subframe includes 14 OFDM symbols, and the first subframe includes P consecutive sTTIs, that is, the 14 OFDM symbols in the subframe are divided into P short transmission time intervals sTTIs. Each sTTI may include a same quantity or different quantities of OFDM symbols, and at least one sTTI that occupies two OFDM symbols exists in the P sTTIs, where P is an integer greater than 1. For example, the first subframe is divided into seven sTTIs, and each sTTI occupies two OFDM symbols.

It can be learned from the first aspect that, a minimum scheduling unit of the TDD carrier in the carrier aggregation system is an sTTI that occupies two OFDM symbols. Transmission of information is performed by using a smaller transmission time interval, so that balance can be achieved between a scheduling delay of the TDD carrier and a scheduling delay of the FDD carrier to some extent. When the TDD carrier is used as the primary component carrier, a feedback opportunity of the system can be increased. When the TDD carrier is used as the secondary component carrier, the feedback opportunity of the system can be fully used. In this way, a feedback bottleneck in the carrier aggregation system is decreased, and an air interface delay is reduced.

With reference to the first aspect, in a first possible implementation of the first aspect, the first subframe includes an sTTI that occupies two OFDM symbols and an sTTI that occupies three OFDM symbols. For example, the first subframe may include six sTTIs, and the six sTTIs may include four sTTIs that each occupy two OFDM symbols and two sTTIs that each occupy three OFDM symbols.

It can be learned from the first possible implementation of the first aspect that, when the first subframe is divided into a combination of an sTTI that occupies two OFDM symbols and an sTTI that occupies three OFDM symbols, a half-frame boundary problem that occurs when sTTI division is performed on the subframe is considered. In this division manner, a subframe can be divided into smaller transmission time intervals to a greatest extent, to provide more opportunities for transmission of information, and achieve balance between the scheduling delay of the TDD carrier and the scheduling delay of the FDD carrier to some extent, so that the feedback bottleneck is decreased, and the air interface delay is reduced.

With reference to the first possible implementation of the first aspect, in a second possible implementation, when the secondary component carrier is the TDD carrier and the primary component carrier is the FDD carrier, that a terminal device receives downlink information by using a secondary component carrier includes: The terminal device receives the downlink information by using a first sTTI in the first subframe of the secondary component carrier, where the first sTTI is one of the P sTTIs. Correspondingly, that the terminal device sends feedback information for the downlink information by using a primary component carrier includes: The terminal device sends the feedback information for the downlink information by using a second sTTI of the primary component carrier, where a timing relationship exists between the second sTTI and the first sTTI.

It can be learned from the second possible implementation of the first aspect that, when the minimum scheduling unit of the TDD carrier is set to the sTTI that occupies two OFDM symbols, the TDD carrier is the secondary component carrier, and the FDD carrier is the primary component carrier, the terminal device may perform transmission of the downlink information by using a smaller transmission time interval. In this way, an uplink feedback opportunity of the FDD carrier can be fully used, thereby reducing the air interface delay of the carrier aggregation system.

With reference to the second possible implementation of the first aspect, in a third possible implementation, when each subframe of the secondary component carrier is the first subframe, and each subframe of the primary component carrier includes an sTTI that occupies two OFDM symbols and an sTTI that occupies three OFDM symbols, that the terminal device receives the downlink information by using a first sTTI in the first subframe of the secondary component carrier includes: The terminal device receives the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M. For example, the carrier aggregation system includes 10 consecutive subframes. If each subframe is divided into six sTTIs, the 10 consecutive subframes include 60 sTTIs. The 60 sTTIs may be numbered based on a time sequence to obtain an index marker corresponding to each sTTI, and each sTTI of a same link corresponds to one unique index marker. Correspondingly, that the terminal device sends the feedback information for the downlink information by using a second sTTI of the primary component carrier includes: The terminal device sends the feedback information for the downlink information by using an $sTTI_m$ in an uplink subframe of the primary component carrier, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

It can be learned from the third possible implementation of the first aspect that, when the FDD carrier is used as the primary component carrier, one opportunity for transmission of uplink information can be generated every two OFDM symbols and every three OFDM symbols; when the TDD carrier used as the secondary component carrier uses an sTTI that occupies two OFDM symbols and an sTTI that occupies three OFDM symbols as scheduling transmission time intervals, a same quantity of consecutive subframes in the carrier aggregation system may include a same quantity of sTTIs, so that balance can be maintained between a scheduling time interval of the TDD carrier and a scheduling time interval of the FDD carrier to a great extent. Because the terminal device receives downlink information delivered by using an $n^{th}$ sTTI of a downlink link of the primary component carrier, and performs feedback on the downlink information by using an $m^{th}$ sTTI of an uplink link of the primary component carrier, feedback on downlink information received by using an $n^{th}$ sTTI of the secondary component carrier may also be performed based on a timing relationship of the primary component carrier by using the $m^{th}$ sTTI of the uplink link of the primary component carrier, so that accuracy of information transmission in the carrier aggregation system can be ensured.

With reference to the third possible implementation of the first aspect, in a fourth possible implementation, m is equal to n+4, to be specific, for downlink information carried in an $sTTI_n$ of the secondary component carrier, a timing relationship is that feedback is performed from an $(n+4)^{th}$ sTTI of the primary component carrier, and a quantity of symbols in four sTTIs is approximately 8 to 12 OFDM symbols. This can ensure that the terminal device can have plenty of time to parse the received downlink information, and can also enable the feedback information to be fed back to a base station within as short a time as possible, so that the accuracy of the information transmission is ensured, and an air interface delay of the information transmission is reduced to some extent.

With reference to the first possible implementation of the first aspect, in a fifth possible implementation, when the primary component carrier is the TDD carrier and the secondary component carrier is the FDD carrier, that a terminal device receives downlink information by using a secondary component carrier includes: The terminal device receives the downlink information by using a first sTTI of the secondary component carrier. Correspondingly, that the terminal device sends feedback information for the downlink information by using a primary component carrier includes: The terminal device sends the feedback information for the downlink information by using a second sTTI in the first subframe of the primary component carrier, where the second sTTI is one of the P sTTIs, and a timing relationship exists between the first sTTI and the second sTTI.

It can be learned from the fifth possible implementation of the first aspect that, when the FDD carrier is the secondary component carrier and the TDD carrier is used as the primary component carrier, the minimum scheduling unit is set to an sTTI that occupies two OFDM symbols, so that more uplink feedback opportunities can be provided, and after receiving the downlink information on the secondary component carrier, the terminal device can perform feedback on the downlink information in time by using more feedback opportunities on the primary component carrier, thereby reducing the air interface delay of the carrier aggregation system.

With reference to the fifth possible implementation of the first aspect, in a sixth possible implementation, when each subframe of the primary component carrier is the first subframe, and each subframe of the secondary component carrier includes an sTTI that occupies two OFDM symbols and an sTTI that occupies three OFDM symbols, that the terminal device receives downlink information by using a first sTTI of the secondary component carrier includes: The terminal device receives the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M. Correspondingly, that the terminal device sends the feedback information for the downlink information by using a second sTTI in the first subframe of the primary component carrier includes: The terminal device sends the feedback information for the downlink information by using an $sTTI_m$ in an uplink subframe of the primary component carrier, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

It can be learned from the sixth possible implementation of the first aspect that, when the secondary component carrier is the FDD carrier, one piece of downlink information can be transmitted to the terminal device every two OFDM symbols and every three OFDM symbols; when the primary component carrier is the TDD carrier, the primary component carrier uses an sTTI that occupies two OFDM symbols and an sTTI that occupies three OFDM symbols as scheduling transmission time intervals, and a same quantity of subframes in the carrier aggregation system may include a same quantity of sTTIs, so that balance can be maintained between a scheduling time interval of the TDD carrier and a scheduling time interval of the FDD carrier to a great extent. Because feedback on downlink information received by using an $n^{th}$ sTTI of a downlink link of the primary component carrier may be performed by using an $m^{th}$ sTTI of an uplink link of the primary component carrier, feedback on downlink information received by the terminal device by using an $n^{th}$ sTTI of the secondary component carrier may also be performed based on a timing relationship of the primary component carrier by using the $m^{th}$ sTTI of the uplink link of the primary component carrier, so that the accuracy of the information transmission is ensured.

With reference to the sixth possible implementation of the first aspect, in a seventh possible implementation, m is equal to n+k, and k is an integer greater than 3, to be specific, for downlink information carried in an $n^{th}$ sTTI, a timing relationship is that feedback is performed from an $(n+k)^{th}$ sTTI of the TDD carrier, and at least eight OFDM symbols are included in more than three sTTIs. This can ensure that the terminal device can have plenty of time to parse the received downlink information, and can also enable the feedback information to be fed back to the base station within as short a time as possible, so that the air interface delay can be reduced while the accuracy of the information transmission is ensured.

With reference to any one of the first aspect or the first to seventh possible implementations of the first aspect, in an eighth possible implementation, if the first subframe is a downlink subframe, and a quantity of OFDM symbols occupied by a physical downlink control channel (PDCCH) is 3, quantities of OFDM symbols occupied by a $1^{st}$ sTTI to a last sTTI included in the first subframe are sequentially 3, 2, 2, 2, 2, and 3.

With reference to any one of the first aspect or the first to seventh possible implementations of the first aspect, in a ninth possible implementation, if the first subframe is a downlink subframe, and a quantity of OFDM symbols occupied by a PDCCH is 1 or 2, quantities of OFDM symbols occupied by a $1^{st}$ sTTI to a last sTTI included in the first subframe are sequentially 2, 3, 2, 2, 2, and 3, or 2, 2, 3, 2, 2, and 3.

With reference to any one of the first aspect or the first to seventh possible implementations of the first aspect, in a tenth possible implementation, if the first subframe is an uplink subframe, quantities of OFDM symbols occupied by a $1^{st}$ sTTI to a last sTTI included in the first subframe are sequentially 3, 2, 2, 2, 2, and 3.

A second aspect of this application provides a communication method for a carrier aggregation system. The carrier aggregation system is a carrier aggregation system including a time division duplex TDD carrier and a frequency division duplex FDD carrier. The method includes: A base station sends downlink information by using a secondary component carrier. The base station receives feedback information for the downlink information by using a primary component carrier, where when the primary component carrier or the secondary component carrier is the TDD carrier, at least one first subframe exists in the TDD carrier, the first subframe includes P consecutive short transmission time intervals sTTIs, and at least one sTTI that occupies two orthogonal frequency division multiplexing OFDM symbols exists in the P sTTIs, where P is an integer greater than 1.

With reference to the second aspect, in a first possible implementation, the first subframe includes an sTTI that occupies two OFDM symbols and an sTTI that occupies three OFDM symbols.

With reference to the first possible implementation of the second aspect, in a second possible implementation, when the secondary component carrier is the TDD carrier and the primary component carrier is the FDD carrier, that a base station sends downlink information by using a secondary component carrier includes: The base station sends the downlink information by using a first sTTI in the first subframe of the secondary component carrier. Correspondingly, that the base station receives feedback information for the downlink information by using a primary component carrier includes: The base station receives the feedback information for the downlink information by using a second sTTI of the primary component carrier, where a timing relationship exists between the second sTTI and the first sTTI.

With reference to the second possible implementation of the second aspect, in a third possible implementation, when each subframe of the secondary component carrier is the first subframe, and each subframe of the primary component carrier includes an sTTI that occupies two OFDM symbols and an sTTI that occupies three OFDM symbols, that the base station sends the downlink information by using a first sTTI in the first subframe of the secondary component carrier includes: The base station sends the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M. Correspondingly, that the base station receives the feedback information for the downlink information by using a second sTTI of the primary component carrier includes: The base station receives the feedback information for the downlink information by using an $sTTI_m$ in an uplink subframe of the primary component carrier, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

With reference to the third possible implementation of the second aspect, in a fourth possible implementation, m is equal to n+4.

With reference to the first possible implementation of the second aspect, in a fifth possible implementation, when the primary component carrier is the TDD carrier and the secondary component carrier is the FDD carrier, that a base station sends downlink information by using a secondary component carrier includes: The base station sends the downlink information by using a first sTTI of the secondary component carrier. Correspondingly, that the base station receives feedback information for the downlink information by using a primary component carrier includes: The base station receives the feedback information for the downlink information by using a second sTTI in the first subframe of the primary component carrier, where a timing relationship exists between the first sTTI and the second sTTI.

With reference to the fifth possible implementation of the second aspect, in a sixth possible implementation, when each subframe of the primary component carrier is the first subframe, and each subframe of the secondary component carrier includes an sTTI that occupies two OFDM symbols and an sTTI that occupies three OFDM symbols, that the base station sends the downlink information by using a second sTTI of the secondary component carrier includes: The base station sends the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M. Correspondingly, that the base station receives the feedback information for the downlink information by using a first sTTI in the first subframe of the primary component carrier includes: The base station receives the feedback information for the downlink information by using an $sTTI_m$ in an uplink subframe of the primary component carrier, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

With reference to the sixth possible implementation of the second aspect, in a seventh possible implementation, m is equal to n+k, and k is an integer greater than 3.

With reference to any one of the second aspect or the first to seventh possible implementations of the second aspect, in an eighth possible implementation, if the first subframe is a downlink subframe, and a quantity of OFDM symbols occupied by a PDCCH is 3, quantities of OFDM symbols occupied by a $1^{st}$ sTTI to a last sTTI included in the first subframe are sequentially 3, 2, 2, 2, 2, and 3.

With reference to any one of the second aspect or the first to seventh possible implementations of the second aspect, in a ninth possible implementation, if the first subframe is a downlink subframe, and a quantity of OFDM symbols occupied by a PDCCH is 1 or 2, quantities of OFDM symbols occupied by a $1^{st}$ sTTI to a last sTTI included in the first subframe are sequentially 2, 3, 2, 2, 2, and 3, or 2, 2, 3, 2, 2, and 3.

With reference to any one of the second aspect or the first to seventh possible implementations of the second aspect, in a ninth possible implementation, if the first subframe is an uplink subframe, quantities of OFDM symbols occupied by a $1^{st}$ sTTI to a last sTTI included in the first subframe are sequentially 3, 2, 2, 2, 2, and 3.

A third aspect of this application provides a communication device. The communication device is configured to perform the communication method for the carrier aggregation system in any one of the first aspect or the possible implementations of the first aspect. Specifically, the communication device may include a module configured to perform the communication method for the carrier aggregation system in any one of the first aspect or the possible implementations of the first aspect.

A fourth aspect of this application provides a communication device. The communication device includes a memory and a processor. The memory is configured to store instructions, the processor is configured to execute the instructions stored in the memory, and execution of the instructions stored in the memory enables the processor to perform the method in any one of the first aspect or the possible implementations of the first aspect.

A fifth aspect of this application provides a computer-readable storage medium. The computer-readable storage medium stores a computer program. When the program is executed by a processor, the method in any one of the first aspect or the possible implementations of the first aspect is implemented.

A sixth aspect of this application provides a network device. The network device is configured to perform the communication method for the carrier aggregation system in any one of the second aspect or the possible implementations of the second aspect. Specifically, the network device may include a module configured to perform the communication method for the carrier aggregation system in any one of the second aspect or the possible implementations of the second aspect.

A seventh aspect of this application provides a network device. The network device includes a memory and a processor. The memory is configured to store instructions, the processor is configured to execute the instructions stored in the memory, and execution of the instructions stored in the memory enables the processor to perform the method in any one of the second aspect or the possible implementations of the second aspect.

An eighth aspect of this application provides a computer-readable storage medium. The computer-readable storage medium stores a computer program. When the program is executed by a processor, the method in any one of the second aspect or the possible implementations of the second aspect is implemented.

In the embodiments of this application, a communication method for a carrier aggregation system is used. The minimum scheduling unit of the TDD carrier in the carrier aggregation system is the sTTI that occupies two OFDM symbols. The transmission of information is performed by using the smaller transmission time interval, so that the balance can be achieved between the scheduling delay of the TDD carrier and the scheduling delay of the FDD carrier in the carrier aggregation system to some extent. When the TDD carrier is used as the primary component carrier, the feedback opportunity of the system can be increased. When the TDD carrier is used as the secondary component carrier, the feedback opportunity of the system can be fully used. In this way, the feedback bottleneck in the carrier aggregation system is decreased, and the air interface delay is reduced.

DETAILED DESCRIPTION

Figure 1:
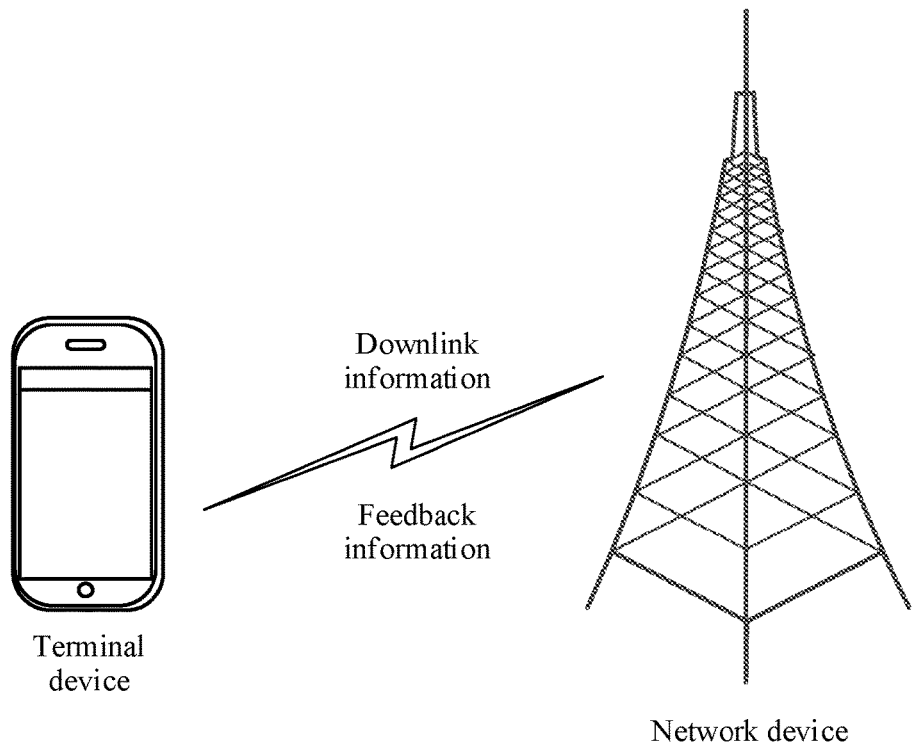
FIG. 1 is a schematic diagram of an embodiment of a communication system according to an embodiment of this application.

In the embodiments of this application, a communication method for a carrier aggregation system is used. A minimum scheduling unit of a TDD carrier in the carrier aggregation system is an sTTI that occupies two OFDM symbols. Transmission of information is performed by using a smaller transmission time interval, so that balance can be achieved between a scheduling delay of the TDD carrier and a scheduling delay of an FDD carrier to some extent. When the TDD carrier is used as a primary component carrier, a feedback opportunity of the system can be increased. When the TDD carrier is used as a secondary component carrier, the feedback opportunity of the system can be fully used. In this way, a feedback bottleneck in the carrier aggregation system is decreased, and an air interface delay is reduced. The embodiments of the present disclosure further provide a corresponding terminal device and network device. The following provides descriptions in detail.

To make the solutions of this application more comprehensible for a person skilled in the art, the embodiments of the present disclosure are clearly described in the following with reference to the accompanying drawings. It is clear that, the embodiments to be described are merely a part rather than all of the embodiments of the present disclosure. All other embodiments obtained by a person of ordinary skill in the art based on the embodiments of this application without creative efforts shall fall within the protection scope of this application. In this specification, claims, and the accompanying drawings of this application, the terms "first", "second", and the like are intended to distinguish between similar objects but do not necessarily indicate a specific order or sequence. It would be appreciated that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, product, or device.

It would be appreciated that the technical solutions in the embodiments of this application may be used for a long term evolution (LTE) architecture, or may be used for a universal mobile telecommunications system (UMTS) terrestrial radio access network (UTRAN) architecture, or a global system for mobile communications (GSM)/enhanced data rates for GSM evolution (EDGE) system radio access network (GERAN) architecture. In the UTRAN architecture or the GERAN architecture, a function of an MME is completed by a serving general packet radio service (GPRS) support node (SGSN), and a function of an SGW/a PGW is completed by a gateway GPRS support node (GGSN). The technical solutions of the embodiments of this application may alternatively be used for another communication system, for example, a public land mobile network (PLMN) system, a 5G communication system, or a post-5G communication system. This is not limited in the embodiments of this application.

A terminal device is provided in the embodiments of this application. The terminal device may include a wireless transceiver function and can cooperate with a network device to provide a communication service for a user. Specifically, the terminal device may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a 5G network or a post-5G network. This is not limited in the embodiments of this application.

A network device is further provided in the embodiments of this application. The network device may be a device configured to communicate with a terminal device. For example, the network device may be a base transceiver station (BTS) in a GSM system or a CDMA system, may be a NodeB (NB) in a WCDMA system, or may be an evolved NodeB (evolutional node B, eNB or eNodeB) in an LTE system. Alternatively, the network device may be a relay station, an access point, a vehicle-mounted device, a wearable device, a network-side device in a future 5G network or a post-5G network, a network device in a future evolved PLMN network, or the like.

The network device in the embodiments of this application may also be referred to as a radio access network (RAN) device. The RAN device is connected to the terminal device, to receive data from the terminal device and send the data to a core network device. The RAN device corresponds to different devices in different communication systems, for example, corresponds to a base station and a base station controller in a 2G system, corresponds to a base station and a radio network controller (RNC) in a 3G system, corresponds to an evolved NodeB (eNB) in a 4G system, and in a 5G system, corresponds to an access network device (for example, a gNB, a CU, or a DU) in the 5G system such as a new radio access system (NR).

FIG. 1 is a schematic diagram of an embodiment of a communication system according to an embodiment of this application.

The communication system includes a network device and a communication device. The communication device may be a terminal device. In the following embodiments, an example in which the communication device is a terminal device is used for description. Alternatively, the communication device in the embodiments of this application may be a circuit. The communication device should not be understood as merely a terminal device. The communication system in the embodiments of this application may include any other quantity of terminal devices or network devices, or a combination thereof. Network settings of two entities, namely, the network device and the communication device that are shown in FIG. 1, are merely considered as a non-limitative example of the embodiments of this application.

In a contemporary wireless system, packet-based transmission is used. Using 3GPP LTE as an example, after receiving a data packet of downlink information over a downlink link, the terminal transmits feedback information for the downlink information, namely, a hybrid automatic repeat request (HARQ) message, to a base station. The HARQ feedback is sent over an uplink link, to respond to information such as a physical downlink shared channel (PDSCH) or the like scheduled by a physical downlink control channel (PDCCH), semi-persistent scheduling (SPS) PDSCH, or a PDCCH or an enhanced physical downlink control channel (EPDCCH) that indicates SPS release. The HARQ message may include an acknowledgement (ACK) or a negative acknowledgement (NACK), and three feedback states may be used: ACK, NACK, and discontinuous transmission (DTX). A successful decoding attempt results in the ACK. The NACK is sent when a decoding attempt is unsuccessful. The DTX refers to discontinuous transmission, and occurs when UE receives no PDSCH, for example, when the UE misses receiving a sent PDCCH/EPDCCH, or when there is no sent PDCCH/EPDCCH or PDSCH. In the embodiments of this application, terms such as downlink, downlink transmission, downlink link, and downlink information may be used to indicate transmission from a network device to a terminal device. Terms such as uplink, uplink transmission, uplink link, and uplink information may be used for transmission in an opposite direction, namely, transmission from a terminal device to a network device.

In a current technology, in some access technologies such as an advanced LTE system, carrier aggregation is performed by performing reception or transmission on a serving cell set, where a serving cell includes at least one downlink component carrier and possibly one uplink component carrier. Herein, a concept of a cell may not refer to a geometrical area, but should be considered as a logical concept. A terminal is configured with a primary serving cell (PCell) and a secondary serving cell (SCell). It would be appreciated that the PCell may alternatively be replaced with a concept of a primary component carrier (PCC), and correspondingly, the SCell may alternatively be replaced with a concept of a secondary component carrier (SCC). Transmission of a physical uplink control channel (PUCCH) is performed on the primary component carrier. Some embodiments define a method for TDD and FDD carrier aggregation, to send a HARQ feedback on a physical uplink shared channel (PUSCH) in the primary component carrier of the wireless communication system in FIG. 1. Therefore, a carrier aggregation system in the embodiments of this application uses at least one TDD carrier and at least one FDD carrier. Specific quantities are not limited herein.

For downlink carrier aggregation, a terminal transmits feedback information on the primary component carrier. For example, in an advanced LTE system, a HARQ feedback is provided on a PUCCH of the primary component carrier, and includes an ACK message and a NACK message that correspond to downlink information received over a downlink link. In a current technology, data transmission is deployed by mainly using a subframe (for example, 1 ms, and 14 OFDM symbols) or a shorter transmission time interval TTI in subframe division. A group of subframes may form a radio frame (for example, 10 ms long), and a group of TTIs may form a subframe (1 ms). Therefore, a subframe in an uplink link may be used to send HARQ information corresponding to a plurality of subframes in a downlink link.

Therefore, in the FDD and TDD carrier aggregation, if the TDD carrier is configured as the primary component carrier, a plurality of downlink subframes or a plurality of downlink TTIs in the FDD carrier may be associated with one uplink subframe or TTI in the TDD carrier, and the one uplink subframe or TTI in the TDD carrier is specified to carry a HARQ feedback used for the FDD carrier and the TDD carrier. If the FDD carrier is configured as the primary component carrier, one or more downlink subframes or TTIs in the TDD carrier may be associated with one uplink subframe or TTI in the FDD carrier.

A lower delay and a higher data rate are objectives of LTE system evolution. In an LTE system, a length of a subframe in time domain is equal to one TTI periodicity, and a TTI is a minimum scheduling unit, and directly determines a value of an air interface delay. Using a shorter transmission delay sTTI in a communication process can effectively reduce buffer requirements of a terminal and an evolved node, and can also improve radio resource utilization efficiency. Therefore, an embodiment of this application provides a communication method for a carrier aggregation system. A TDD carrier in the carrier aggregation system uses an sTTI that occupies two OFDM symbols as a minimum scheduling transmission time interval. Details are illustrated according to FIG. 2.

Figure 2:
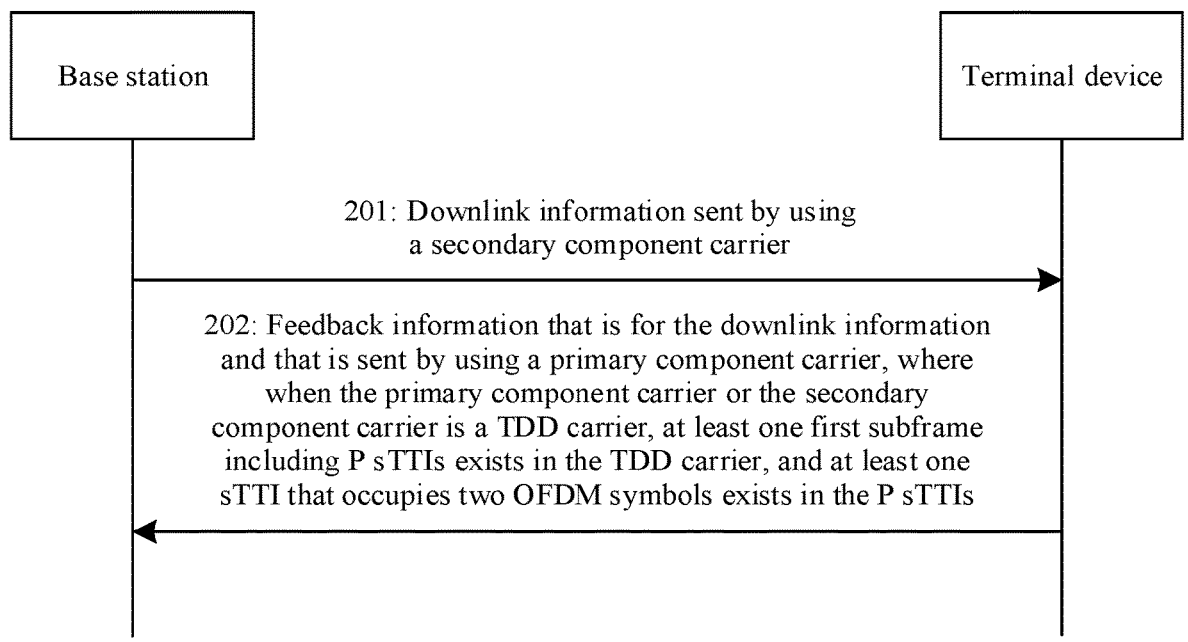
FIG. 2 is a schematic diagram of an embodiment of a communication method for a carrier aggregation system according to an embodiment of this application.

FIG. 2 is a schematic diagram of an embodiment of a communication method for a carrier aggregation system according to an embodiment of this application. The method includes the following steps.

At 201, a terminal receives downlink information by using a secondary component carrier.

The carrier aggregation system in this embodiment of this application is a carrier aggregation system including an FDD carrier and a TDD carrier, and the carrier aggregation system includes one primary component carrier and at least one secondary component carrier. When the primary component carrier is the FDD carrier, the secondary component carrier is one TDD carrier, and it would be appreciated that the carrier aggregation system may further include another secondary component carrier other than the TDD carrier, for example, another TDD carrier or another FDD carrier. Correspondingly, when the primary component carrier is the TDD carrier, the secondary component carrier is one FDD carrier, and the carrier aggregation system may further include another secondary component carrier other than the FDD carrier, for example, another FDD carrier or another TDD carrier. The carrier aggregation system in this embodiment of this application uses at least one TDD carrier and at least one FDD carrier. However, specific quantities of TDD carriers and FDD carriers are not limited herein.

For the carrier aggregation system of the FDD carrier and the TDD carrier, if the primary component carrier is the FDD carrier and the secondary component carrier is the TDD carrier, the terminal receives, over a downlink link of the TDD carrier, downlink information transmitted by a base station. When the primary component carrier is the TDD carrier and the secondary component carrier is the FDD carrier, the terminal receives, over a downlink link of the FDD carrier, downlink information transmitted by a base station.

At 202, the terminal sends feedback information for the downlink information by using the primary component carrier. When the primary component carrier or the secondary component carrier is the TDD carrier, at least one first subframe that includes P sTTIs exists in the TDD carrier, and at least one sTTI that occupies two OFDM symbols exists in the P sTTIs, where P is an integer greater than 1.

In the carrier aggregation system in this embodiment of this application, the primary component carrier may be the TDD carrier. In this case, the secondary component carrier is the FDD carrier. The primary component carrier may alternatively be the FDD carrier. In this case, the secondary component carrier is the TDD carrier. In a communication process, the TDD carrier may be divided into a plurality of scheduling units. The scheduling unit herein is a time interval used for information transmission between the terminal device and the base station. For example, one scheduling unit in the TDD carrier may be one subframe, one slot (a length of half a subframe), or the like. In this embodiment of this application, the TDD carrier includes at least one first subframe, the first subframe is divided into P smaller sTTIs used for information transmission, each sTTI may serve as a scheduling unit to be used for transmission of information that needs to be sent by the base station or the terminal device, and at least one sTTI that occupies two OFDM symbols exists in the P sTTIs. In this way, the TDD carrier has a very small transmission time interval as a scheduling unit, namely, an sTTI that occupies two OFDM symbols. A length of a conventional subframe is 14 OFDM symbols, where the 14 OFDM symbols are 1 ms, and two OFDM symbols are about 0.14 ms.

In this embodiment of this application, after receiving, by using the secondary component carrier, the downlink information sent by the base station, the terminal device generates the corresponding feedback information for the downlink information, and transmits the feedback information for the downlink information to the base station over an uplink link of the primary component carrier. The feedback information in this embodiment of this application is information that is generated by the terminal based on the received downlink information and that needs to be transmitted to the base station and that is associated with the downlink information, for example, determining information for the downlink information or associated uplink scheduling information for the downlink information. A specific type of the downlink information and a specific type of the corresponding feedback information are not specifically limited in this embodiment of this application.

In the carrier aggregation system in this embodiment of this application, an sTTI that occupies two or three OFDM symbols may be used for subframe division of the FDD carrier. Optionally, an sTTI that occupies seven OFDM symbols may alternatively be used for the subframe division of the FDD carrier. Alternatively, an sTTI of another length may be used for the subframe division. A subframe division pattern of the FDD carrier is not specifically limited in this embodiment of this application.

In this embodiment of this application, the communication method for the carrier aggregation system is used. A minimum scheduling unit of the TDD carrier in the carrier aggregation system is the sTTI that occupies two OFDM symbols. Transmission of information is performed by using a smaller transmission time interval, so that balance can be achieved between a scheduling delay of the TDD carrier and a scheduling delay of the FDD carrier to some extent. When the TDD carrier is used as the primary component carrier, a feedback opportunity of the system can be increased. When the TDD carrier is used as the secondary component carrier, a feedback opportunity of the system can be fully used. In this way, a feedback bottleneck in the carrier aggregation system is decreased, and an air interface delay is reduced.

Based on the foregoing communication method, an embodiment of this application further provides an sTTI division method for a subframe in a TDD carrier. Details are illustrated according to FIG. 3.

Figure 3:
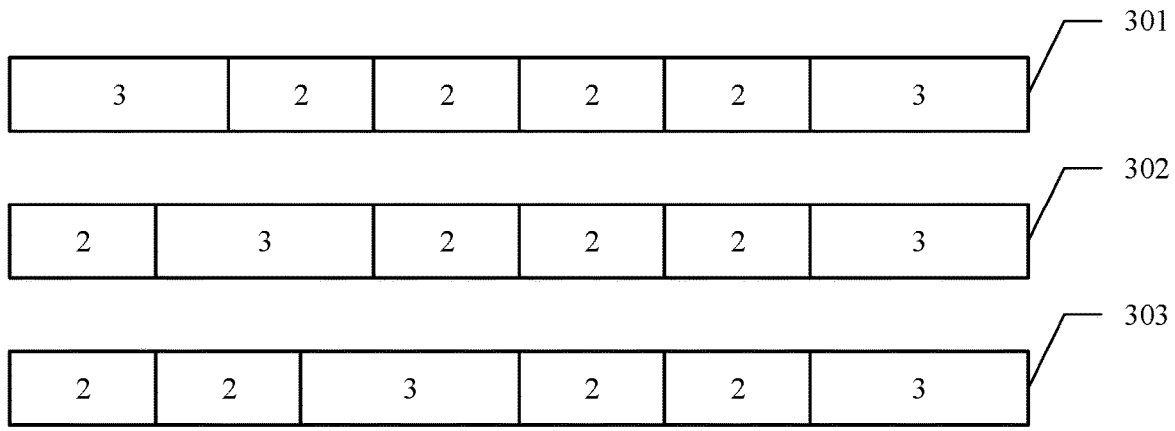
FIG. 3 is a schematic diagram of an sTTI division pattern of a first subframe in a TDD carrier according to an embodiment of this application.

FIG. 3 is a schematic diagram of an sTTI division pattern of a first subframe in a TDD carrier according to an embodiment of this application.

FIG. 3 shows three sTTI division structures 301, 302, and 303 of the first subframe in the TDD carrier. It can be learned from FIG. 3 that, the structure 301 is a $1^{st}$ division pattern of the first subframe, and is {3,2,2,2,2,3}; the structure 302 is a $2^{nd}$ division pattern of the first subframe, and is {2,3,2,2,2,3}; the structure 303 is a $3^{rd}$ division pattern of the first subframe, and is {2,2,3,2,2,3}. The three division patterns are all applicable to sTTI division of an uplink subframe and a downlink subframe in the TDD carrier.

For sTTI division of the downlink subframe in the TDD carrier, the structure 301 is applicable to a case in which a conventional control area, such as a PDCCH in 3GPP LTE, occupies three OFDM symbols; the structure 302 and the structure 303 are applicable to a case in which the conventional control area, such as the PDCCH in 3GPP LTE, occupies one or two OFDM symbols.

It would be appreciated that, the first subframe shown in FIG. 3 is a conventional subframe whose length is 1 ms and includes 14 OFDM symbols. In an actual application process, the subframe in the TDD carrier may alternatively include another quantity of OFDM symbols, and has another length. In some scenarios and cases, if a subframe in the carrier aggregation system includes another quantity of OFDM symbols, a division approach for performing structure division on the subframe by using an sTTI that occupies two OFDM symbols, an sTTI that occupies three OFDM symbols, or a combination thereof in this embodiment of this application may still be used. This is not specifically limited in this embodiment of this application.

The foregoing describes an sTTI division method for the first subframe in the TDD carrier in the embodiments of this application. The following first describes a communication method in the embodiments of this application in a communication scenario in which the primary component carrier is the FDD carrier and the secondary component carrier is the TDD carrier. Details are illustrated by related descriptions in FIG. 4 to FIG. 6.

Figure 4:
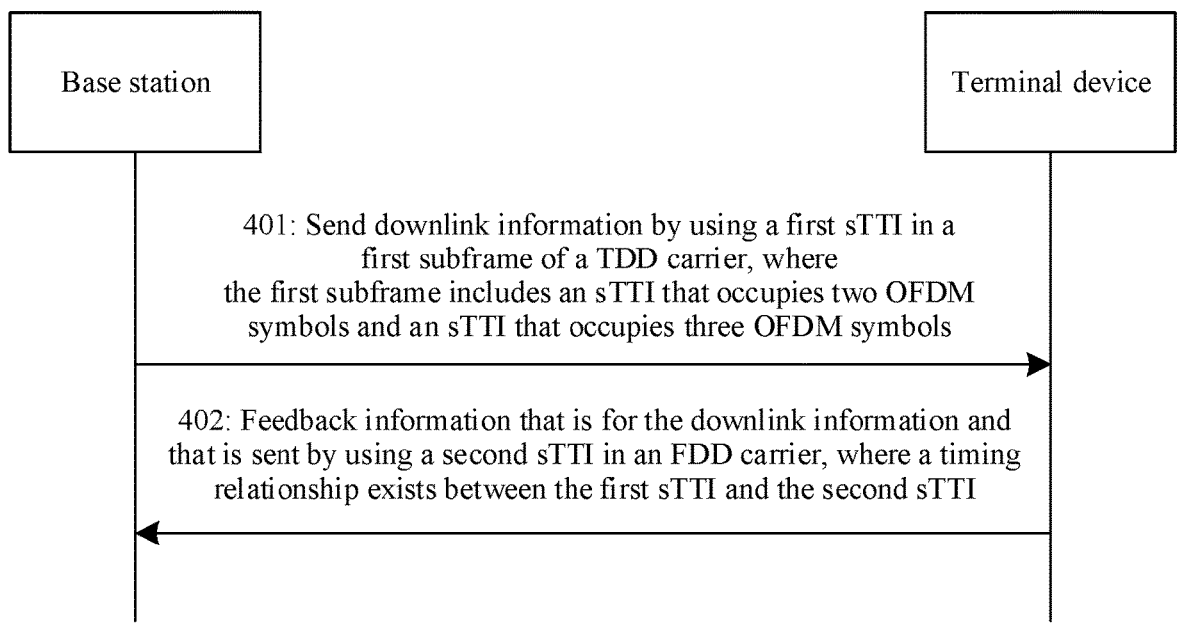
FIG. 4 is a schematic diagram of another embodiment of a communication method for a carrier aggregation system according to an embodiment of this application.

FIG. 4 is a schematic diagram of another embodiment of a communication method for a carrier aggregation system according to an embodiment of this application. The method includes the following steps.

At 401, a terminal device receives downlink information by using a first sTTI in a first subframe of a secondary component carrier, where the first subframe includes an sTTI that occupies two OFDM symbols and an sTTI that occupies three OFDM symbols.

In the carrier aggregation system in this embodiment of this application, a primary component carrier is an FDD carrier, and the secondary component carrier is a TDD carrier. At least one first subframe that includes P sTTIs exists in the secondary component carrier. The first subframe may include P sTTIs that include the sTTI that occupies two OFDM symbols and the sTTI that occupies three OFDM symbols, that is, at least one subframe divided into the sTTI that occupies two OFDM symbols and the sTTI that occupies three OFDM symbols exists in the secondary component carrier. Therefore, relatively small scheduling units, namely, the sTTI that occupies two OFDM symbols and the sTTI that occupies three OFDM symbols, exist in the secondary component carrier, and are used for transmission of downlink information. It would be appreciated that, the secondary component carrier in this embodiment of this application may partially include the first subframe, and may further include a subframe in another sTTI division pattern, for example, a subframe including two sTTIs that each occupy seven OFDM symbols, or a subframe that is not divided into smaller sTTIs, where an sTTI or a TTI is used as scheduling units of the secondary component carrier. In addition, all subframes in the secondary component carrier in this embodiment of this application may be first subframes, that is, each subframe in the secondary component carrier is divided into an sTTI that occupies two OFDM symbols and an sTTI that occupies three OFDM symbols. This is not limited in this embodiment of this application.

In this embodiment of this application, the terminal device may receive downlink information delivered by a base station by using an sTTI that occupies two or three OFDM symbols, namely, downlink information sent by using a first sTTI in the first subframe of the secondary component carrier. The first sTTI is one of the P sTTIs in the first subframe.

It would be appreciated that, the carrier aggregation system in this embodiment of this application may further include another secondary component carrier other than the TDD carrier, for example, another TDD carrier or another FDD carrier. A quantity of TDD carriers and a quantity of FDD carriers are not specifically limited herein in this embodiment of this application.

At 402, the terminal device sends feedback information for the downlink information by using a second sTTI of the primary component carrier, where a timing relationship exists between the second sTTI and the first sTTI.

In this embodiment of this application, after receiving the downlink information delivered by the base station by using the sTTI that occupies two or three OFDM symbols, the terminal device generates the corresponding feedback information for the downlink information, and transmits the feedback information for the downlink information to the base station by using the second sTTI over an uplink link of the primary component carrier.

It would be appreciated that, the second sTTI in this embodiment of this application refers to one of a plurality of scheduling units obtained by dividing the primary component carrier in a communication process. The scheduling unit herein is a time interval used by the terminal and the base station to perform information transmission on the primary component carrier, and the scheduling unit in the primary component carrier may be a subframe (1 ms), a slot (seven OFDM symbols), or a shorter transmission time interval (less than seven OFDM symbols, for example, two or three OFDM symbols). For example, a subframe of the primary component carrier may be divided into an sTTI that occupies two OFDM symbols and an sTTI that occupies three OFDM symbols. Optionally, a subframe of the primary component carrier may alternatively be divided into sTTIs that each occupy seven OFDM symbols, or may be divided into sTTIs of another length. A scheduling unit of the FDD carrier is not specifically limited in this embodiment of this application.

In this embodiment of this application, the timing relationship exists between the first sTTI of the secondary component carrier and the second sTTI of the primary component carrier. The timing relationship is a time sequence relationship: After receiving the downlink information transmitted by using the first sTTI, the terminal transmits the feedback information for the downlink information in the second sTTI of the primary component carrier. Such a timing relationship may be that, when the base station sends the downlink information to the terminal at a moment $T_0$ by using the first sTTI of the secondary component carrier, the second sTTI in which the terminal sends the feedback information to the base station by using the primary component carrier corresponds to a moment that is eight OFDM symbols after $T_0$. This is not limited in this embodiment of this application.

In this embodiment of this application, in the carrier aggregation system of the FDD carrier and the TDD carrier, when the secondary component carrier is the TDD carrier, there are relatively small scheduling units used by the base station to transmit the downlink information to the terminal device, namely, the sTTI that occupies two OFDM symbols and the sTTI that occupies three OFDM symbols. When the base station transmits the downlink information to the terminal device by using the sTTI that occupies two OFDM symbols and the sTTI that occupies three OFDM symbols, balance can be achieved between a scheduling delay of the TDD carrier and a scheduling delay of the FDD carrier to some extent, and an uplink feedback opportunity of the FDD carrier can be fully used, so that a feedback bottleneck in the carrier aggregation system is decreased, and an air interface delay is reduced.

Figure 5:
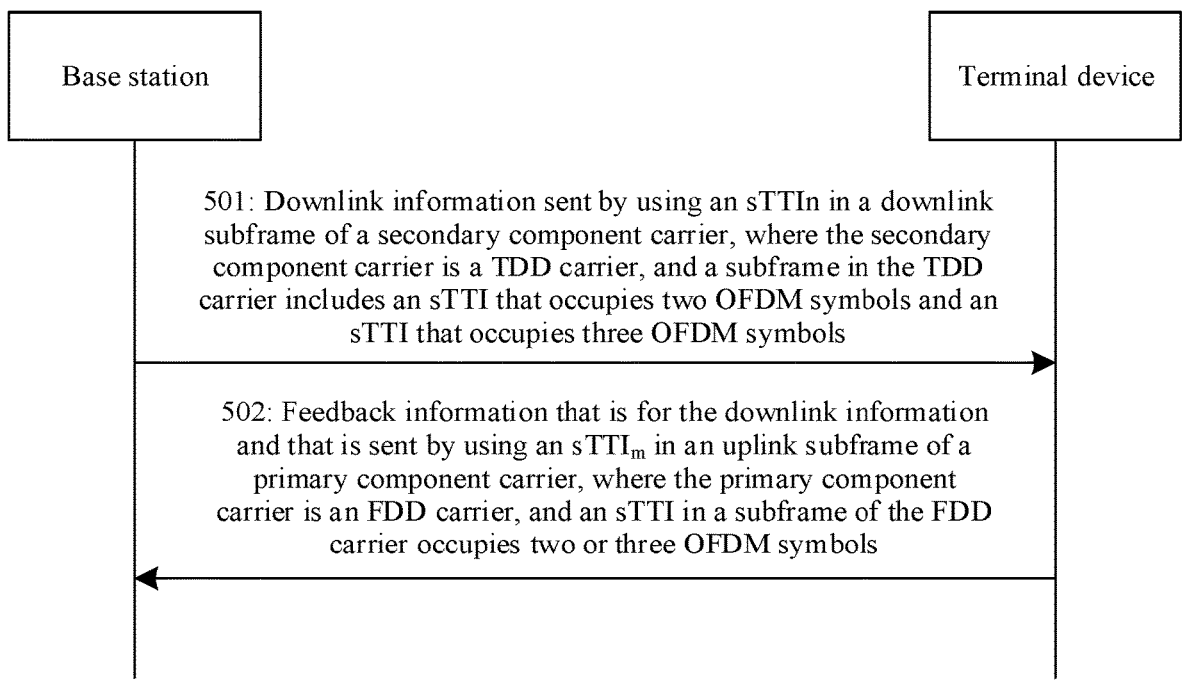
FIG. 5 is a schematic diagram of another embodiment of a communication method for a carrier aggregation system according to an embodiment of this application.

FIG. 5 is a schematic diagram of another embodiment of a communication method for a carrier aggregation system according to an embodiment of this application. The method includes the following steps.

At 501, a terminal receives downlink information by using an $sTTI_n$ in a downlink subframe of a secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M.

In the carrier aggregation system in this embodiment of this application, a primary component carrier is an FDD carrier, and the secondary component carrier is a TDD carrier. For the TDD carrier in this embodiment of this application, an sTTI of each subframe of the TDD carrier occupies two or three OFDM symbols. In other words, the subframe of the TDD carrier includes sTTIs that each occupy two or three OFDM symbols. For understanding of a subframe division pattern of the TDD carrier, description has been made according to FIG. 3. Details are not described herein again.

The terminal receives the downlink information delivered by a base station by using the $sTTI_n$ in the downlink subframe of the secondary component carrier, where n is the index marker, the M consecutive subframes of the TDD carrier in the carrier aggregation system include the N sTTIs, and the $sTTI_n$ is the sTTI ranked in the $n^{th}$ place based on the time sequence in the N sTTIs. In this embodiment of this application, the downlink information may be information such as a PDCCH or a PDSCH, or may be specifically another type of information sent by the base station to the terminal. This is not specifically limited herein.

At 502, the terminal sends feedback information for the downlink information by using an sTTIm in an uplink subframe of the primary component carrier, where the sTTIm indicates an sTTI whose index marker is m, the sTTIm is an sTTI ranked in an mth place based on the time sequence in the N sTTIs included in M consecutive subframes in the carrier aggregation system, and a value of m is the same as a corresponding index value of an sTTI that is used for transmission of the feedback information when the downlink information is delivered by using the sTTIn in the downlink subframe of the primary component carrier.

In this embodiment of this application, the primary component carrier is the FDD carrier, and an sTTI of each subframe of the FDD carrier occupies two or three OFDM symbols. In other words, the subframe of the primary component carrier includes sTTIs that each occupy two or three OFDM symbols. For example, an sTTI division pattern of the subframe of the primary component carrier may be {3,2,2,2,2,3} or {2,3,2,2,2,3}, or optionally may be another division pattern. This is not limited in this embodiment of this application. When lengths of subframes in the carrier aggregation system are all the same, the M subframes corresponding to the secondary component carrier and the M subframes corresponding to the primary component carrier may be divided into a same quantity of sTTIs.

After receiving the downlink information delivered by the base station by using the $sTTI_n$ in the downlink subframe of the secondary component carrier, the terminal sends the feedback information for the downlink information by using the $sTTI_m$ in the uplink subframe of the primary component carrier, where m is an index marker, the M consecutive subframes of the FDD carrier in the carrier aggregation system include the N sTTIs, and the $sTTI_m$ is the sTTI ranked in the $m^{th}$ place based on the time sequence in the N sTTIs. In this embodiment of this application, because the M subframes corresponding to the secondary component carrier and the M subframes corresponding to the primary component carrier may be divided into a same quantity of sTTIs, index markers of the secondary component carrier and index markers of the primary component carrier are the same and correspond to each other. Because for downlink information transmitted over a downlink link of the primary component carrier, corresponding feedback information also needs to be transmitted over an uplink link of the primary component carrier, a time sequence relationship exists between feedback information transmission over the uplink link and the downlink link of the primary component carrier. For example, for downlink information transmitted by using an $sTTI_n$ in the downlink link, corresponding feedback information is fed back in an $sTTI_{n+4}$ in the uplink link. Therefore, the value of m may be the same as the corresponding index value of the sTTI that is used for transmission of the feedback information when the downlink information is delivered by using the $sTTI_n$ in the downlink subframe of the primary component carrier. For example, if the corresponding index value of the sTTI that is in the uplink subframe of the primary component carrier and that is used for transmission of the feedback information when the downlink information is delivered by using the $sTTI_n$ in the downlink subframe of the primary component carrier is n+4, m=n+4. It may be understood that in an actual application process, there may be another time sequence relationship m=n+r, where r is an integer greater than 0. For example, the time sequence relationship may be m=n+1 or m=n+6. This is not specifically limited herein.

The terminal sends the feedback information for the downlink information to the base station by using the $sTTI_m$ in the primary component carrier. The feedback information may be, for example, a HARQ message in response to a PDSCH scheduled by a PDCCH, an SPS PDSCH, or a PDCCH/an EPDCCH indicating SPS release. More specifically, the feedback information may be an ACK message or a NACK message. A time sequence relationship exists between the $sTTI_n$ in the secondary component carrier carrying the downlink information and the $sTTI_m$ in the primary component carrier carrying the feedback information corresponding to the downlink information. In other words, based on the time sequence relationship, when the base station delivers a downlink message to the terminal by using the $sTTI_n$ in the downlink subframe of the secondary component carrier, after receiving the downlink message, the terminal sends a feedback message to the base station by using the $sTTI_m$ in the uplink subframe of the primary component carrier.

In this embodiment of this application, when the primary component carrier is the FDD carrier, the primary component carrier uses the sTTI that occupies two OFDM symbols and the sTTI that occupies three OFDM symbols as scheduling transmission time intervals, and in this case, one opportunity for transmission of uplink information can be generated every two OFDM symbols and every three OFDM symbols; when the secondary component carrier is the TDD carrier, the secondary component carrier uses the sTTI that occupies two OFDM symbols and the sTTI that occupies three OFDM symbols as scheduling transmission time intervals, and balance is maintained between the scheduling transmission time interval of the secondary component carrier and the scheduling transmission time interval of the primary component carrier to a great extent. A transmission opportunity of the primary component carrier can be fully used for feedback information generated for downlink information whose transmission is performed by using each sTTI of the secondary component carrier. In this way, a feedback bottleneck in the TDD-FDD carrier aggregation system is avoided as much as possible, and an air interface delay is reduced.

Figure 6:
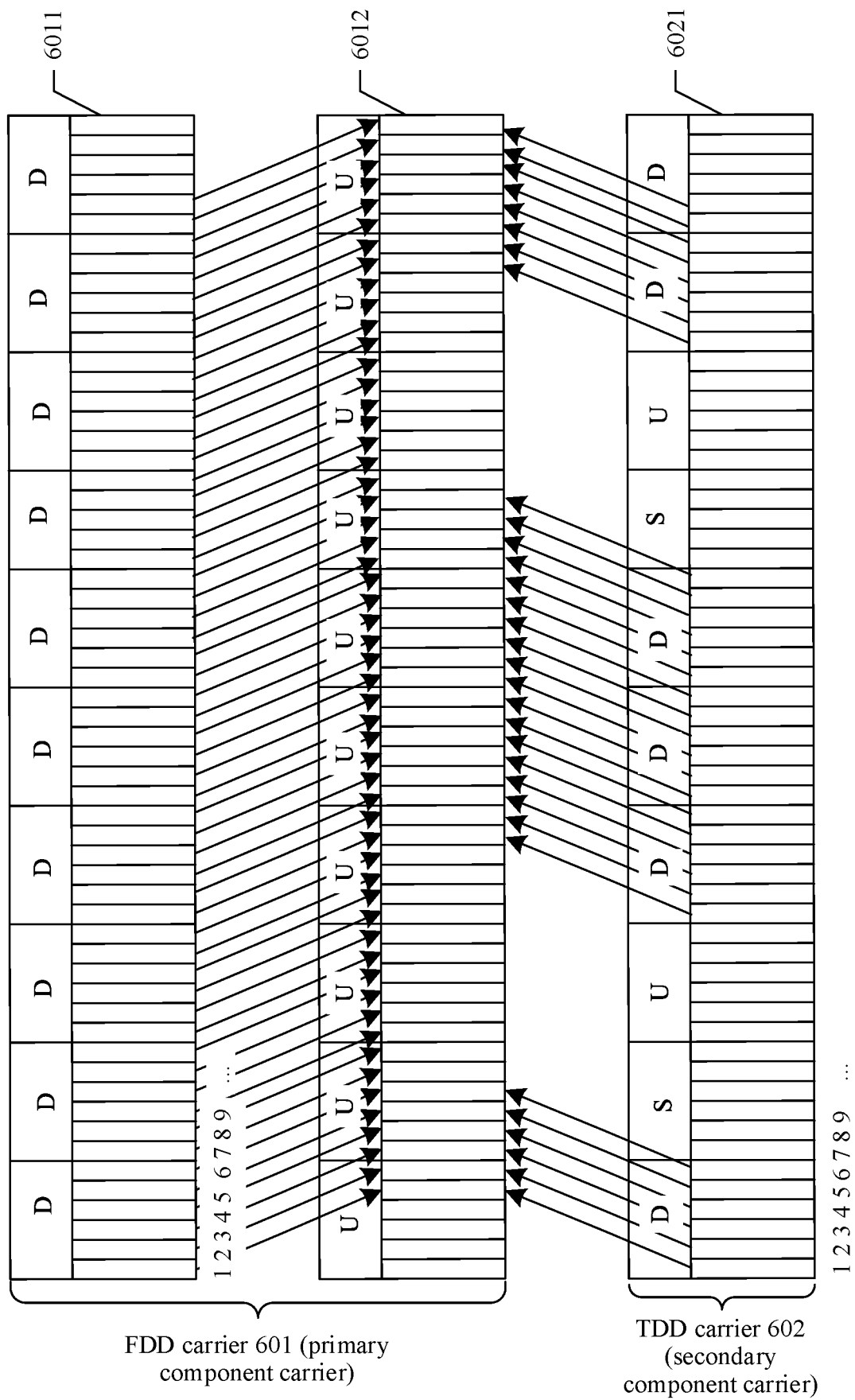
FIG. 6 is a schematic diagram of an embodiment of radio frames in a carrier aggregation system according to an embodiment of this application.

FIG. 6 is a schematic diagram of an embodiment of radio frames in a carrier aggregation system according to an embodiment of this application.

As shown in FIG. 6, in the carrier aggregation system in this embodiment of this application, a primary component carrier is an FDD carrier 601, and a secondary component carrier is a TDD carrier 602. For both the primary component carrier and the secondary component carrier, a subframe is divided into an sTTI having a length of two OFDM symbols and an sTTI having a length of three OFDM symbols, and each subframe of the primary component carrier and the secondary component carrier is divided into six sTTIs. It would be appreciated that, in this embodiment of this application, for both the primary component carrier and the secondary component carrier, a length of one radio frame is 10 ms, each radio frame includes 10 subframes, and a length of each subframe is 1 ms. It may be understood that, in this embodiment of this application, a conventional subframe in a current technology, namely, a subframe having a length of 1 ms, is used as an example in the present disclosure, and a subframe in the carrier aggregation system may have another length. This is not specifically limited herein.

For ease of description, the figure shows one radio frame 6012 in an uplink link of the primary component carrier, one radio frame 6011 that is in a downlink link and that corresponds to the radio frame 6012, and one radio frame 6021 of the TDD carrier. In the figure, the letter "D" indicates a downlink subframe, the letter "U" indicates an uplink subframe, and the letter "S" indicates a special subframe. The radio frame 6011 in FIG. 6 includes 10 downlink subframes, the radio frame 6012 includes 10 uplink subframes, and the radio frame 6021 includes a total of 10 downlink subframes, uplink subframes, and special subframes. A frame structure of the radio frame 6021 is "DSUDDDSUDD". It would be appreciated that, in addition to the frame structure of "DSUDDDSUDD", a radio frame structure of the TDD carrier further includes six other frame structures. For details, refer to Table 1. It would be appreciated that FIG. 6 shows one TDD frame structure to describe a communication method in embodiments of this application. In an actual application process, the other TDD frame structures are all applicable, and the embodiment shown in FIG. 6 should not be considered as a limitation on the communication method in the embodiments of this application.

TABLE 1

TDD uplink-downlink configuration defined by 3GPP

| TDD frame structure | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Each subframe in the primary component carrier and the secondary component carrier includes six sTTIs, and a length of each sTTI is two or three OFDM symbols, as shown in FIG. 6. Specifically, an sTTI division pattern of the subframe of the primary component carrier may be {3,2,2,2,2,3} or {2,3,2,2,2,3}, or optionally may be another division pattern. For an sTTI division pattern of the subframe of the secondary component carrier, description has been made according to FIG. 3, and details are not described herein again.

For ease of description, in this embodiment of this application, sTTIs in the three radio frames shown in the figure are further marked based on a time sequence. Specifically, a sorting result is represented by using an index marker, and one sTTI corresponds to one index marker, which is used to indicate a location of the sTTI in the carrier. As shown in FIG. 6, quantities of sTTIs of the radio frame 6011, the radio frame 6012, and the radio frame 6021 are the same, and each subframe in each radio frame and sTTIs in each subframe are complete and consecutive. An index marker in a digital form may be used to identify a location of an sTTI. The index marker in this embodiment of this application is described by using the radio frame 6012 as an example. sTTIs in each uplink subframe in the radio frame 6012 are complete and consecutive, and an index marker of a $1^{st}$ sTTI located in a $1^{st}$ subframe may be 1. In this case, index markers of next five sTTIs are sequentially 2, 3, 4, 5, and 6; an index marker of a $1^{st}$ sTTI located in a $2^{nd}$ subframe is 7, and index markers of next five sTTIs are sequentially 8, 9, 10, 11, and 12; and so on. Index markers of sTTIs located in a last subframe are sequentially 56, 57, 58, 58, 59, and 60. Correspondingly, corresponding index markers may also be used for sTTIs in the radio frame 6011 and the radio frame 6021. Optionally, another identifier may alternatively be used to mark a location of each sTTI in a carrier. This is not specifically limited herein.

A terminal receives downlink information by using an $sTTI_n$ in the secondary component carrier, where n is an index marker of the sTTI, and the downlink information may be information such as a PDCCH or a PDSCH, or may be specifically another type of information sent by a base station to the terminal. This is not specifically limited herein. After receiving the downlink information by using the $sTTI_n$, the terminal sends feedback information for the downlink information to the base station by using an $sTTI_m$ in the primary component carrier, namely, the FDD carrier. The feedback information may be, for example, a HARQ message in response to a PDSCH scheduled by a PDCCH, a semi-persistent scheduling SPS PDSCH, or a PDCCH/an EPDCCH indicating SPS release. More specifically, the feedback information may be an ACK message or a NACK message. A time sequence relationship between the $sTTI_n$ in the secondary component carrier carrying the downlink information and the $sTTI_m$ in the primary component carrier carrying the feedback information corresponding to the downlink information. In other words, based on the time sequence relationship, when the base station delivers a downlink message to the terminal by using the $sTTI_n$ in the downlink subframe of the secondary component carrier, after receiving the downlink message, the terminal sends a feedback message to the base station by using the $sTTI_m$ in the uplink subframe of the primary component carrier.

The communication method for the carrier aggregation system in the embodiments of this application is specifically described by using sTTI division structures of the radio frames shown in FIG. 6. It can be learned from FIG. 6 that, a time sequence relationship, for example, a time sequence relationship indicated by arrows in the figure, exists between sTTIs in uplink and downlink subframes of the primary component carrier. To be specific, feedback information for downlink information in an $sTTI_n$ in a downlink subframe of the primary component carrier is carried in an $sTTI_{n+4}$ in an uplink subframe of the primary component carrier. For example, after receiving downlink information carried in an sTTI whose index number is 1 in a downlink subframe of the primary component carrier, the terminal transmits corresponding feedback information by using an sTTI whose index number is 5 in an uplink subframe. Because a quantity of sTTIs included in a radio frame of the primary component carrier is the same as a quantity of sTTIs included in a radio frame of the secondary component carrier, after receiving a downlink message by using an $sTTI_n$ in the secondary component carrier, the terminal may alternatively transmit a feedback message for the downlink message by using an $sTTI_{n+4}$ in the primary component carrier. In this case, for feedback information for downlink information delivered by using an $sTTI_n$ in a downlink subframe of the secondary component carrier, the terminal performs feedback by using an $sTTI_{n+4}$ in an uplink subframe of the primary component carrier. For example, for feedback information for downlink information delivered by using an $sTTI_n$ in a downlink subframe of the secondary component carrier, the terminal may alternatively perform feedback by using an $sTTI_4$ in an uplink subframe of the primary component carrier.

It may be understood that, in this embodiment of this application, in addition to the time sequence relationship shown in FIG. 6, in an actual application process, another sTTI time sequence relationship may be used based on an actual situation to perform transmission of feedback information for received downlink information. For example, the another sTTI time sequence relationship may be m=n+1 or m=n+2, or may be m=n+6. This is not specifically limited in this embodiment of this application.

Embodiments of this application provide a communication method for a carrier aggregation system. In the carrier aggregation system, a primary component carrier is an FDD carrier, and a secondary component carrier is a TDD carrier. For both the primary component carrier and the secondary component carrier, a subframe is divided into an sTTI having a length of two OFDM symbols and an sTTI having a length of three OFDM symbols. Each subframe of the primary component carrier and the secondary component carrier is divided into six sTTIs. For the primary component carrier, an opportunity for transmission of uplink information can be continuously generated every two OFDM symbols and every three OFDM symbols. The secondary component carrier uses an sTTI that occupies two OFDM symbols and an sTTI that occupies three OFDM symbols as scheduling transmission time intervals, and balance is maintained between the scheduling transmission time interval of the secondary component carrier and a scheduling transmission time interval of the primary component carrier to a great extent. A transmission opportunity of the primary component carrier can be fully used for feedback information generated for downlink information whose transmission is performed by using each sTTI of the secondary component carrier. In this way, a feedback bottleneck in the TDD-FDD carrier aggregation system is avoided as much as possible, and an air interface delay is reduced.

The foregoing describes the communication method in the embodiments of this application in a communication scenario in which the primary component carrier is the FDD carrier and the secondary component carrier is the TDD carrier. The following describes a communication method in the embodiments of this application in a communication scenario in which the primary component carrier is the TDD carrier and the secondary component carrier is the FDD carrier. Details are illustrated by related descriptions according to FIG. 7 to FIG. 9.

Figure 7:
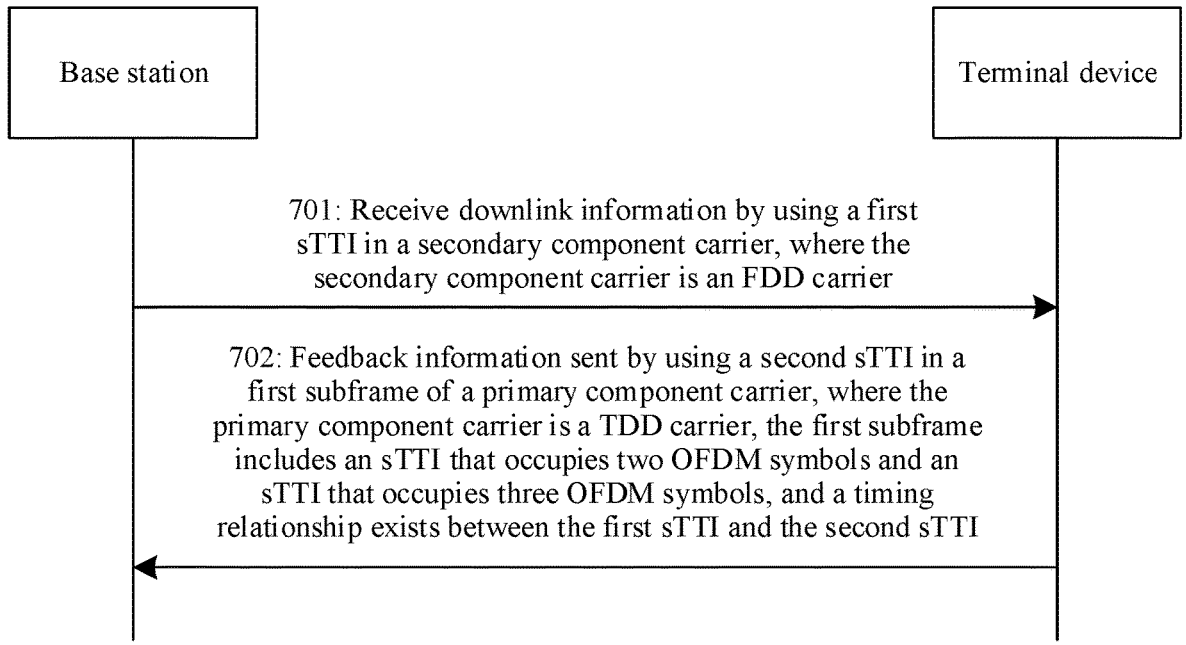
FIG. 7 is a schematic diagram of another embodiment of a communication method for a carrier aggregation system according to an embodiment of this application.

FIG. 7 is a schematic diagram of another embodiment of a communication method for a carrier aggregation system according to an embodiment of this application. The method includes the following steps.

At 701, a terminal device receives downlink information by using a first sTTI of a secondary component carrier.

In the carrier aggregation system in this embodiment of this application, a primary component carrier is a TDD carrier, and the secondary component carrier is an FDD carrier. It would be appreciated that, the carrier aggregation system in this embodiment of this application may further include another secondary component carrier other than the FDD carrier, for example, another TDD carrier or another FDD carrier. A quantity of TDD carriers and a quantity of FDD carriers are not specifically limited herein in this embodiment of this application.

In this embodiment of this application, the terminal device receives the downlink information transmitted by a base station by using the first sTTI of the secondary component carrier. The first sTTI in this embodiment of this application refers to one of a plurality of scheduling units obtained by dividing the secondary component carrier in a communication process. The scheduling unit herein is a time interval used by the terminal device and the base station to perform information transmission on the secondary component carrier, and the scheduling unit in the secondary component carrier may be a subframe (1 ms), a slot (half a subframe), or a shorter transmission time interval (less than seven OFDM symbols, for example, two or three OFDM symbols). For example, a subframe of the secondary component carrier may be divided into an sTTI that occupies two OFDM symbols and an sTTI that occupies three OFDM symbols. Optionally, a subframe of the secondary component carrier may alternatively be divided into sTTIs that each occupy seven OFDM symbols, or may be divided into sTTIs of another length. A scheduling unit, namely, the first sTTI, of the FDD carrier is not specifically limited in this embodiment of this application.

At 702, the terminal device sends feedback information for the downlink information by using a second sTTI in a first subframe of the primary component carrier, where the first subframe includes an sTTI that occupies two OFDM symbols and an sTTI that occupies three OFDM symbols, and a timing relationship exists between the first sTTI and the second sTTI.

In this embodiment of this application, after receiving the downlink information delivered by the base station by using the first sTTI of the secondary component carrier, the terminal device generates the corresponding feedback information for the downlink information, and may transmit the feedback information for the downlink information by using the sTTI that occupies two or three OFDM symbols, that is, transmit the feedback information for the downlink information by using the second sTTI in the first subframe of the primary component carrier. In this embodiment of this application, at least one first subframe exists in the primary component carrier. The first subframe may include P sTTIs that include the sTTI that occupies two OFDM symbols and the sTTI that occupies three OFDM symbols, that is, at least one subframe divided into the sTTI that occupies two OFDM symbols and the sTTI that occupies three OFDM symbols exists in the primary component carrier. Therefore, relatively small scheduling units, namely, the sTTI that occupies two OFDM symbols and the sTTI that occupies three OFDM symbols, exist in the primary component carrier, and are used for transmission of the feedback information.

In this embodiment of this application, the timing relationship exists between the first sTTI of the secondary component carrier and the second sTTI of the primary component carrier. The timing relationship is a time sequence relationship: After receiving the downlink information transmitted by using the first sTTI, the terminal transmits the feedback information for the downlink information in the second sTTI of the primary component carrier. Such a timing relationship may be that, when the base station sends the downlink information to the terminal at a moment $T_0$ by using the first sTTI of the secondary component carrier, the second sTTI in which the terminal sends the feedback information to the base station by using the primary component carrier corresponds to a moment that is eight OFDM symbols after $T_0$. This is not limited in this embodiment of this application.

It would be appreciated that, the primary component carrier in this embodiment of this application may partially include the first subframe, and may further include a subframe in another sTTI division pattern, for example, a subframe including two sTTIs that each occupy seven OFDM symbols, or a subframe that is not divided into smaller sTTIs, where an sTTI or a TTI is used as scheduling units of the primary component carrier. Alternatively, all subframes in the primary component carrier in this embodiment of this application may be first subframes, that is, each subframe in the primary component carrier is divided into an sTTI that occupies two OFDM symbols and an sTTI that occupies three OFDM symbols. This is not limited in this embodiment of this application.

In this embodiment of this application, the timing relationship exists between the first sTTI of the secondary component carrier and the second sTTI of the primary component carrier. The timing relationship is a time sequence relationship: After receiving the downlink information transmitted by using the first sTTI, the terminal transmits the feedback information for the downlink information in the second sTTI of the primary component carrier.

In this embodiment of this application, in the carrier aggregation system of the FDD carrier and the TDD carrier, when the primary component carrier is the TDD carrier, there are relatively small scheduling units used by the terminal device to transmit the feedback information to the base station, namely, the sTTI that occupies two OFDM symbols and the sTTI that occupies three OFDM symbols. When the terminal device transmits the feedback information to the base station by using the sTTI that occupies two OFDM symbols and the sTTI that occupies three OFDM symbols, balance can be achieved between a scheduling delay of the TDD carrier and a scheduling delay of the FDD carrier to some extent, and an uplink feedback opportunity can be increased, so that a feedback bottleneck in the carrier aggregation system is decreased, and an air interface delay is reduced.

Figure 8:
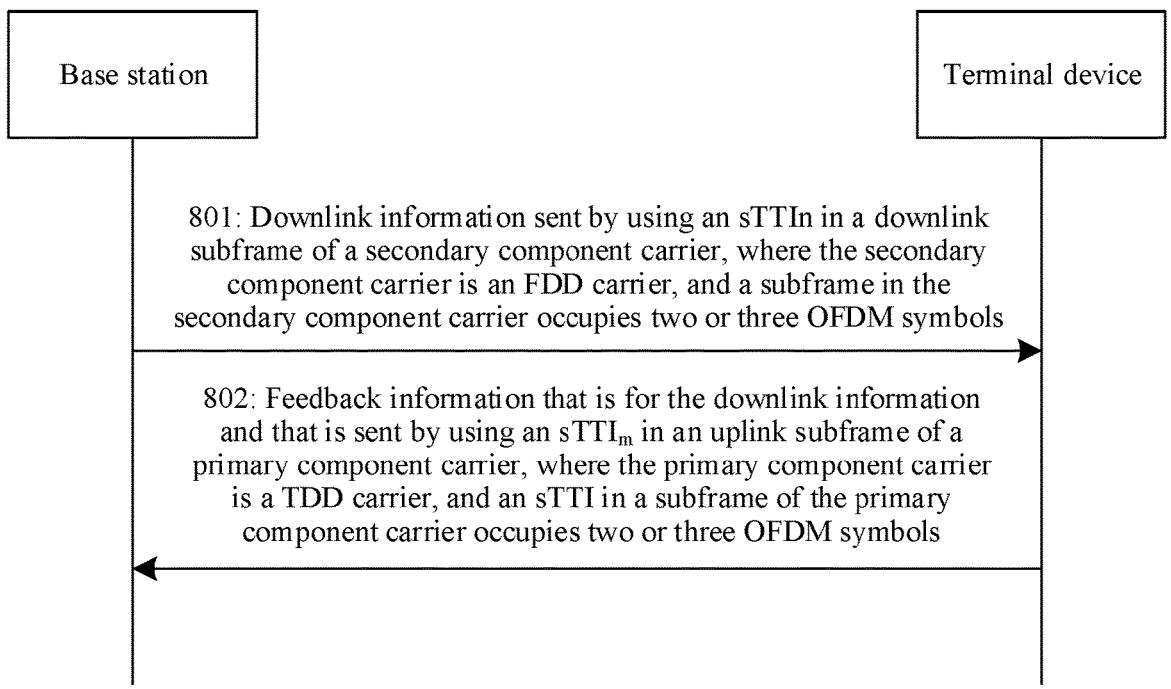
FIG. 8 is a schematic diagram of another embodiment of a communication method for a carrier aggregation system according to an embodiment of this application.

FIG. 8 is a schematic diagram of another embodiment of a communication method for a carrier aggregation system according to an embodiment of this application. The method includes the following steps.

At 801, a terminal receives the downlink information by using an $sTTI_n$ in a downlink subframe of a secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M.

The carrier aggregation system in this embodiment of this application is a carrier aggregation system in which a primary component carrier is a TDD carrier, and the secondary component carrier is an FDD carrier. For the secondary component carrier in this embodiment of this application, an sTTI of each subframe of the TDD carrier occupies two or three OFDM symbols. In other words, the subframe of the secondary component carrier includes sTTIs that each occupy two or three OFDM symbols. For example, an sTTI division pattern of the subframe of the secondary component carrier may be {3,2,2,2,2,3} or {2,3,2,2,2,3}, or optionally may be another division pattern. This is not limited in this embodiment of this application. When lengths of subframes in the carrier aggregation system are all the same, M subframes corresponding to the primary component carrier and the M subframes corresponding to the secondary component carrier may be divided into a same quantity of sTTIs.

The terminal receives the downlink information delivered by a base station by using the $sTTI_n$ in the downlink subframe of the secondary component carrier, where n is the index marker, the M consecutive subframes of the secondary component carrier in the carrier aggregation system include the N sTTIs, and the $sTTI_n$ is the sTTI ranked in the $n^{th}$ place based on the time sequence in the N sTTIs. In this embodiment of this application, the downlink information may be information such as a PDCCH or a PDSCH, or may be specifically another type of information sent by the base station to the terminal device. This is not specifically limited herein.

At 802, the terminal sends feedback information for the downlink information by using an $sTTI_m$ in an uplink subframe of the primary component carrier, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

For the primary component carrier in this embodiment of this application, an sTTI of each subframe of the TDD carrier occupies two or three OFDM symbols. In other words, the subframe of the primary component carrier includes sTTIs that each occupy two or three OFDM symbols. For understanding of a subframe division pattern of the primary component carrier, description has been made according to FIG. 3. Details are not described herein again.

After receiving the downlink information delivered by the base station by using the $sTTI_n$ in the downlink subframe of the secondary component carrier, the terminal sends the feedback information for the downlink information by using the $sTTI_m$ in the uplink subframe of the primary component carrier, where m is an index marker, the M consecutive subframes of the primary component carrier in the carrier aggregation system include the N sTTIs, and the $sTTI_m$ is the sTTI ranked in the $m^{th}$ place based on the time sequence in the N sTTIs. In this embodiment of this application, because the M subframes corresponding to the primary component carrier and the M subframes corresponding to the secondary component carrier may be divided into a same quantity of sTTIs, index markers of the secondary component carrier and index markers of the primary component carrier are the same and correspond to each other. Because for downlink information transmitted over a downlink link of the primary component carrier, corresponding feedback information also needs to be transmitted over an uplink link of the primary component carrier, a time sequence relationship exists between feedback information transmission over the uplink link and the downlink link of the primary component carrier. For example, for downlink information transmitted by using an $sTTI_n$ in a downlink subframe of the primary component carrier, corresponding feedback information is fed back in an $sTTI_{n+k}$ in an uplink subframe of the primary component carrier. Herein, a value of k is an integer greater than 0. A factor determining the value of k is an uplink-downlink configuration of the TDD carrier. For the uplink-downlink configuration of the TDD carrier, refer to Table 1. Therefore, the value of m in the primary component carrier may be the same as the corresponding index value of the sTTI that is used for transmission of the feedback information when the downlink information is delivered by using the $sTTI_n$ in the downlink subframe of the secondary component carrier. For example, if the corresponding index value of the sTTI that is in the uplink subframe of the primary component carrier and that is used for transmission of the feedback information when the downlink information is delivered by using the $sTTI_n$ in the downlink subframe of the primary component carrier is n+k, m=n+k. It may be understood that in an actual application process, there may be another time sequence relationship, for example, m=n+r, where r is an integer greater than 0. For example, the time sequence relationship may be m=n+1 or m=n+6. This is not specifically limited herein.

In this embodiment of this application, when the secondary component carrier is the FDD carrier, the secondary component carrier uses the sTTI that occupies two OFDM symbols and the sTTI that occupies three OFDM symbols as scheduling transmission time intervals, and in this case, transmission of one piece of downlink information is performed every two OFDM symbols and every three OFDM symbols; when the primary component carrier is the TDD carrier, the primary component carrier uses the sTTI that occupies two OFDM symbols and the sTTI that occupies three OFDM symbols as scheduling transmission time intervals, and in this case, each uplink subframe can provide more feedback opportunities, and balance is maintained between the scheduling time interval of the primary component carrier and the scheduling time interval of the secondary component carrier to a great extent. In this way, feedback information generated for downlink information whose transmission is performed by using each sTTI of the secondary component carrier can be transmitted to the base station in a timely manner, so that a feedback bottleneck in the TDD-FDD carrier aggregation system is avoided as much as possible, and an air interface delay is reduced.

Figure 9:
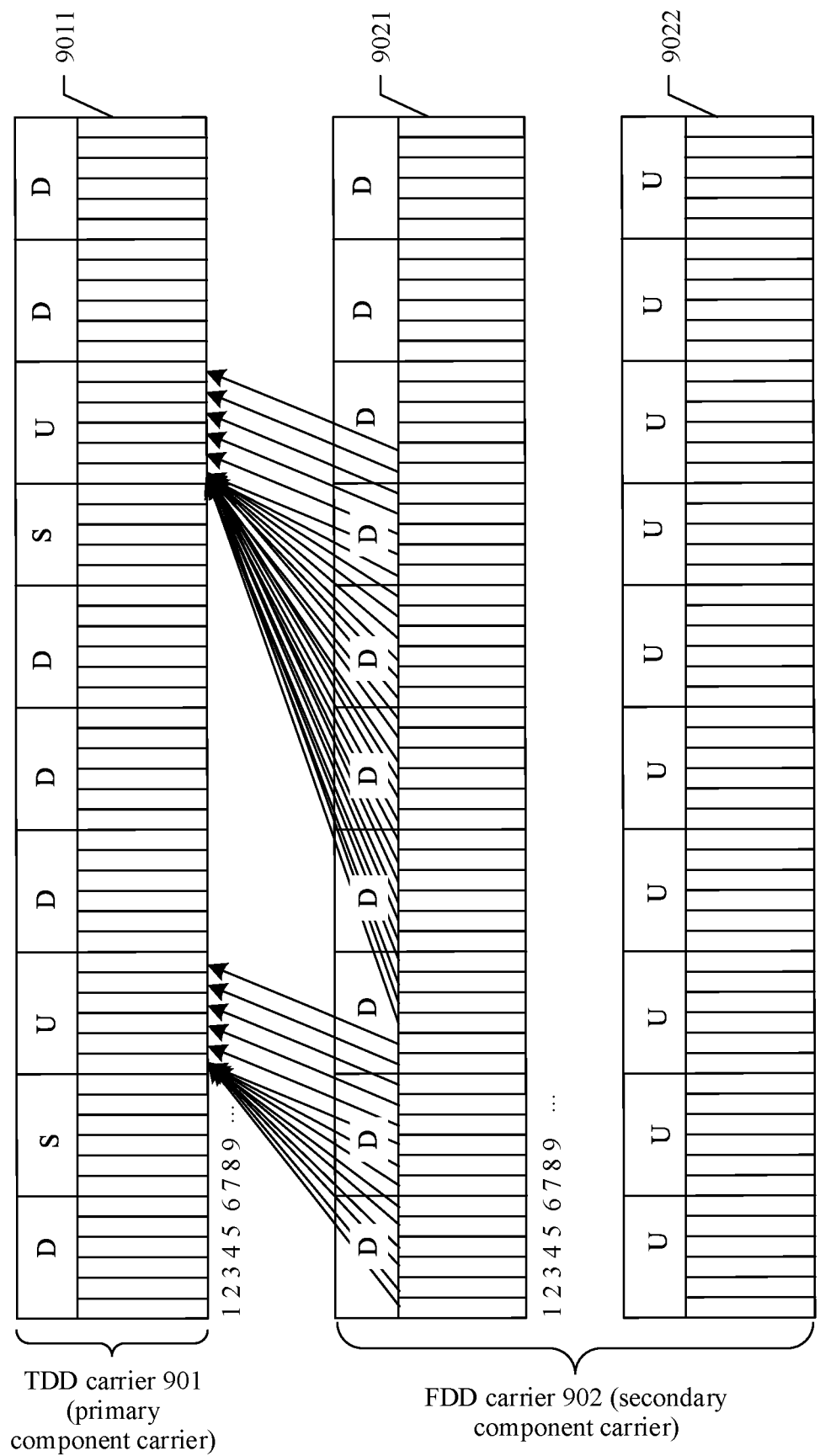
FIG. 9 is a schematic diagram of another embodiment of radio frames in a carrier aggregation system according to an embodiment of this application.

FIG. 9 is a schematic diagram of another embodiment of radio frames in a carrier aggregation system according to an embodiment of this application.

As shown in FIG. 9, in the carrier aggregation system in this embodiment of this application, a primary component carrier is a TDD carrier 901, and a secondary component carrier is an FDD carrier 902. For both the secondary component carrier and the primary component carrier, a subframe is divided into an sTTI having a length of two OFDM symbols and an sTTI having a length of three OFDM symbols, and each subframe of the secondary component carrier and the primary component carrier is divided into six sTTIs. It would be appreciated that, in this embodiment of this application, for both the FDD carrier and the TDD carrier, a length of one radio frame is 10 ms, each radio frame includes 10 subframes, and a length of each subframe is 1 ms. It may be understood that, in this embodiment of this application, a conventional subframe in a current technology, namely, a subframe having a length of 1 ms, is used as an example in the present disclosure, and a subframe in the carrier aggregation system may have another length. This is not specifically limited herein.

For ease of description, the figure shows one radio frame 9011 of the TDD carrier, one radio frame 9021 in a downlink link of the FDD carrier, and one radio frame 9022 that is in a uplink link and that corresponds to the radio frame 9021. In the figure, the letter "D" indicates a downlink subframe, the letter "U" indicates an uplink subframe, and the letter "S" indicates a special subframe. The radio frame 9021 in FIG. 9 includes 10 downlink subframes, the radio frame 9022 includes 10 uplink subframes, and the radio frame 9011 includes a total of 10 downlink subframes, uplink subframes, and special subframes. A frame structure of the radio frame 9011 is "DSUDDDSUDD". It would be appreciated that, in addition to the frame structure of "DSUDDD-SUDD", a radio frame structure of the TDD carrier further includes six other frame structures. For details, refer to Table 1. It would be appreciated that FIG. 9 shows one TDD frame structure to describe a communication method in embodiments of this application. In an actual application process, the other TDD frame structures are all applicable, and the embodiment shown in FIG. 9 should not be considered as a limitation on the communication method in the embodiments of this application.

Each subframe in the primary component carrier and the secondary component carrier includes six sTTIs, and a length of each sTTI is two or three OFDM symbols, as shown in FIG. 9. Specifically, an sTTI division pattern of the subframe of the secondary component carrier may be {3,2,2,2,2,3} or {2,3,2,2,2,3}, or optionally may be another division pattern. For an sTTI division pattern of the subframe of the primary component carrier, description has been made according to FIG. 3 for understanding, and details are not described herein again.

For ease of description, in this embodiment of this application, sTTIs in the three radio frames shown in the figure are further marked based on a time sequence. Specifically, a sorting result is represented by using an index marker, and one sTTI corresponds to one index marker, which is used to indicate a location of the sTTI in the carrier. As shown in FIG. 9, quantities of sTTIs of the radio frame 9021, the radio frame 9022, and the radio frame 9011 are the same, and each subframe in each radio frame and sTTIs in each subframe are complete and consecutive. An index marker in a digital form may be used to identify a location of an sTTI. The index marker in this embodiment of this application is described by using the radio frame 9021 as an example. sTTIs in each downlink subframe in the radio frame 9021 are complete and consecutive, and an index marker of a $1^{st}$ sTTI located in a $1^{st}$ subframe may be 1. In this case, index markers of next five sTTIs are sequentially 2, 3, 4, 5, and 6; an index marker of a $1^{st}$ sTTI located in a $2^{nd}$ subframe is 7, and index markers of next five sTTIs are sequentially 8, 9, 10, 11, and 12; and so on. Index markers of sTTIs located in a last subframe are sequentially 56, 57, 58, 58, 59, and 60. Correspondingly, corresponding index markers may also be used for sTTIs in the radio frame 9022 and the radio frame 9011. Optionally, another identifier may alternatively be used to mark a location of each sTTI in a carrier. This is not specifically limited herein.

The communication method for the carrier aggregation system in the embodiments of this application is described by using sTTI structures of the radio frames shown in FIG. 9: A terminal receives downlink information by using an $sTTI_n$ of the secondary component carrier, where n is an index marker of the sTTI. The downlink information may be information such as a PDCCH or a PDSCH, or may be specifically another type of information sent by the base station to the terminal. This is not specifically limited herein. After receiving the downlink information by using the $sTTI_n$, the terminal sends feedback information for the downlink information to the base station by using an $sTTI_m$ in the primary component carrier. The feedback information may be, for example, a HARQ message in response to a PDSCH scheduled by a PDCCH, a semi-persistent scheduling SPS PDSCH, or a PDCCH/an EPDCCH indicating SPS release. More specifically, the feedback information may be an ACK message or a NACK message. A time sequence relationship between the $sTTI_n$ in the secondary component carrier carrying the downlink information and the $sTTI_m$ in the primary component carrier carrying the feedback information corresponding to the downlink information. In other words, based on the time sequence relationship, when the base station delivers a downlink message to the terminal by using the $sTTI_n$ in the downlink subframe of the secondary component carrier, after receiving the downlink message, the terminal sends a feedback message to the base station by using the $sTTI_m$ in the uplink subframe of the primary component carrier. In FIG. 9, a time sequence relationship exists between sTTIs in uplink and downlink subframes of the primary component carrier. To be specific, feedback information for downlink information in an $sTTI_n$ in a downlink subframe of the primary component carrier is carried in an $sTTI_{n+k}$ in an uplink subframe of the primary component carrier. Because a quantity of sTTIs included in a radio frame of the secondary component carrier is the same as a quantity of sTTIs included in a radio frame of the primary component carrier, after receiving a downlink message by using an $sTTI_n$ in the secondary component carrier, the terminal may alternatively transmit a feedback message for the downlink message by using an $sTTI_{n+k}$ in the primary component carrier. Refer to a time sequence relationship m=n+k indicated by arrows in the figure. It may be understood that, in this embodiment of this application, in addition to the time sequence relationship shown in FIG. 9, in an actual application process, another sTTI time sequence relationship may be used based on an actual situation to perform transmission of feedback information for received downlink information. For example, the another sTTI time sequence relationship may be m=n+1 or m=n+2, or may be m=n+6. This is not specifically limited in this embodiment of this application.

In the carrier aggregation system in this embodiment of this application, the primary component carrier is the TDD carrier, and the secondary component carrier is the FDD carrier. For both the secondary component carrier and the primary component carrier, a subframe is divided into an sTTI having a length of two OFDM symbols and an sTTI having a length of three OFDM symbols, and each subframe of the secondary component carrier and the primary component carrier is divided into six sTTIs. The secondary component carrier uses the sTTI that occupies two OFDM symbols or the sTTI that occupies three OFDM symbols as scheduling transmission time intervals, and in this case, transmission of one piece of downlink information is performed every two OFDM symbols and every three OFDM symbols; the primary component carrier uses the sTTI that occupies two OFDM symbols and the sTTI that occupies three OFDM symbols as scheduling transmission time intervals, and in this case, each uplink subframe can provide more feedback opportunities, and balance is maintained between the scheduling time interval of the primary component carrier and the scheduling time interval of the secondary component carrier to a great extent. In this way, feedback information generated for downlink information whose transmission is performed by using each sTTI of the secondary component carrier can be transmitted to the base station in a timely manner, so that a feedback bottleneck in the TDD-FDD carrier aggregation system is avoided as much as possible, and an air interface delay is reduced.

The foregoing describes the communication method for the carrier aggregation system in the embodiments of this application. The following describes a terminal device and a network device that are used in the carrier aggregation system in the embodiments of this application.

Figure 10:
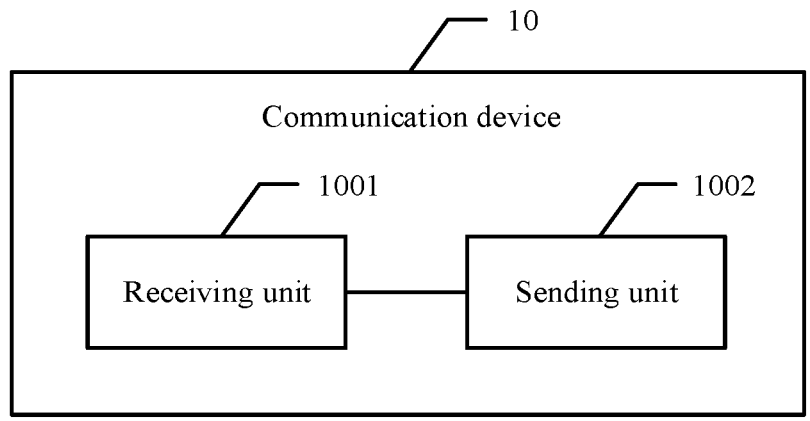
FIG. 10 is a schematic diagram of an embodiment of a communication device according to an embodiment of this application.

FIG. 10 is a schematic diagram of a communication device 10 according to an embodiment of this application. The communication device 10 is used in a carrier aggregation system of an FDD carrier and a TDD carrier. The communication device 10 includes:

a receiving unit 1001, configured to receive downlink information by using a secondary component carrier; and a sending unit 1002, configured to send, by using a primary component carrier, feedback information for the downlink information received by the receiving unit 1001, where when the primary component carrier or the secondary component carrier is the TDD carrier, at least one first subframe exists in the TDD carrier, the first subframe includes P consecutive short transmission time intervals sTTIs, and at least one sTTI that occupies two orthogonal frequency division multiplexing OFDM symbols exists in the P sTTIs, where P is an integer greater than 1.

In this embodiment of this application, when the primary component carrier is the TDD carrier whose minimum scheduling unit is the sTTI that occupies two OFDM symbols, the carrier aggregation system has more feedback opportunities. The communication device can feed back downlink information on the FDD carrier by using more feedback opportunities. When the secondary component carrier is the TDD carrier whose minimum scheduling unit is the sTTI that occupies two OFDM symbols, the carrier aggregation system has a smaller scheduling unit for transmission of downlink information, and the communication device may receive the downlink information by using a relatively small scheduling unit, such as the sTTI that occupies two OFDM symbols, of the TDD carrier, and fully use the feedback opportunities on the FDD carrier. In this way, a feedback bottleneck in the carrier aggregation system is decreased, and an air interface delay in a communication process is reduced.

Optionally, in an embodiment, the receiving unit 1001 is configured to: when the secondary component carrier is the TDD carrier and the primary component carrier is the FDD carrier, receive the downlink information by using a first sTTI in the first subframe of the secondary component carrier, where the first subframe includes an sTTI that occupies two OFDM symbols and an sTTI that occupies three OFDM symbols; and correspondingly, the sending unit 1002 is configured to send, by using a second sTTI of the primary component carrier, the feedback information for the downlink information received by the receiving unit, where a timing relationship exists between the second sTTI and the first sTTI.

Optionally, in an embodiment, the receiving unit 1001 is configured to: when the secondary component carrier is the TDD carrier and the primary component carrier is the FDD carrier, each subframe of the secondary component carrier is the first subframe, the first subframe includes an sTTI that occupies two OFDM symbols and an sTTI that occupies three OFDM symbols, and each subframe of the primary component carrier includes the sTTI that occupies two OFDM symbols and the sTTI that occupies three OFDM symbols, receive the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M; and correspondingly, the sending unit 1002 is configured to send, by using an $sTTI_m$ in an uplink subframe of the primary component carrier, the feedback information for the downlink information received by the receiving unit, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

Optionally, in an embodiment, the receiving unit 1001 is configured to: when the primary component carrier is the TDD carrier and the secondary component carrier is the FDD carrier, receive downlink information by using a first sTTI of the secondary component carrier; and correspondingly, the sending unit is configured to send, by using a second sTTI in the first subframe of the primary component carrier, the feedback information for the downlink information received by the receiving unit, where the first subframe includes an sTTI that occupies two OFDM symbols and an sTTI that occupies three OFDM symbols, and a timing relationship exists between the first sTTI and the second sTTI.

Optionally, in an embodiment, the receiving unit 1001 is configured to: when the primary component carrier is the TDD carrier and the secondary component carrier is the FDD carrier, each subframe of the primary component carrier is the first subframe, the first subframe includes an sTTI that occupies two OFDM symbols and an sTTI that occupies three OFDM symbols, and each subframe of the secondary component carrier includes the sTTI that occupies two OFDM symbols and the sTTI that occupies three OFDM symbols, receive the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M; and correspondingly, the sending unit 1002 is configured to send, by using an $sTTI_m$ in an uplink subframe of the primary component carrier, the feedback information for the downlink information received by the receiving unit, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

It would be appreciated that the receiving unit 1001 and the sending unit 1002 in this embodiment of this application may be implemented by a transceiver or a transceiver-related circuit component.

Figure 11:
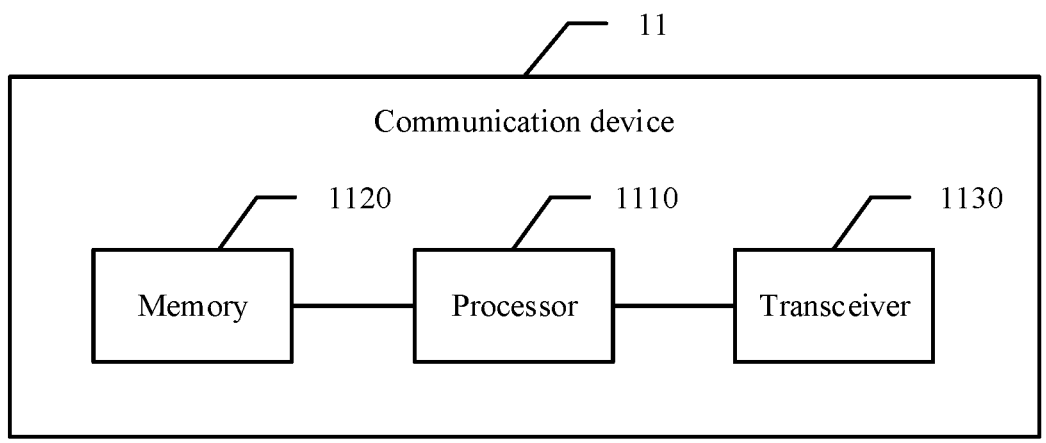
FIG. 11 is a schematic diagram of another embodiment of a communication device according to an embodiment of this application.

As shown in FIG. 11, an embodiment of this application further provides a communication device 11. The communication device 11 includes a processor 1110, a memory 1120, and a transceiver 1130. The memory 1120 stores instructions or a program, and the processor 1110 is configured to execute the instructions or the program stored in the memory 1120. When the instructions or program stored in the memory 1120 is executed, the transceiver 1130 is configured to perform the operations performed by the receiving unit 1001 and the sending unit 1002 in the foregoing embodiment.

It would be appreciated that the communication device 10 or the communication device 11 according to the embodiments of this application may correspond to the terminal device in the communication method for the carrier aggregation system in the embodiments of this application, and operations or functions of the modules in the communication device 10 or the communication device 11 are respectively for implementing corresponding procedures of each method in FIG. 2 to FIG. 9. For brevity, details are not described herein again.

Figure 12:
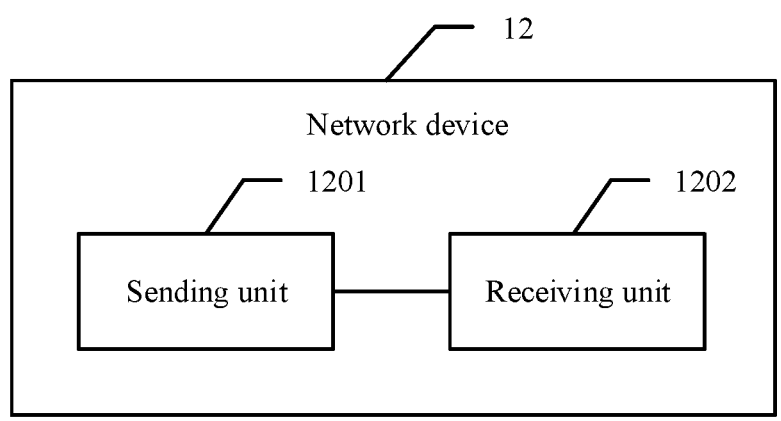
FIG. 12 is a schematic diagram of an embodiment of a network device according to an embodiment of this application.

FIG. 12 is a schematic diagram of an embodiment of a network device 12 according to an embodiment of this application. The network device 12 is used in a carrier aggregation system including an FDD carrier and a TDD carrier. The network device 12 includes:

a sending unit 1201, configured to send downlink information by using a secondary component carrier; and a receiving unit 1202, configured to receive, by using a primary component carrier, feedback information for the downlink information sent by the sending unit 1201, where when the primary component carrier or the secondary component carrier is the TDD carrier, at least one first subframe exists in the TDD carrier, the first subframe includes P consecutive short transmission time intervals sTTIs, and at least one sTTI that occupies two orthogonal frequency division multiplexing OFDM symbols exists in the P sTTIs, where P is an integer greater than 1.

In this embodiment of this application, when the secondary component carrier is the TDD carrier whose minimum scheduling unit is an sTTIs with two OFDM symbols, the carrier aggregation system has a smaller scheduling unit for transmission of downlink information, and the network device may deliver the downlink information to a terminal device by using a relatively small scheduling unit, such as the sTTI that occupies two OFDM symbols, of the TDD carrier. When the primary component carrier is the TDD carrier whose minimum scheduling unit is the sTTI that occupies two OFDM symbols, the carrier aggregation system has more feedback opportunities, and a communication device can receive feedback information sent by the terminal device by fully using feedback opportunities on the FDD carrier. In this way, a feedback bottleneck in the carrier aggregation system is decreased, and an air interface delay in a communication process is reduced.

Optionally, in an embodiment, the sending unit 1201 is configured to: when the secondary component carrier is the TDD carrier, and the primary component carrier is the FDD carrier, send the downlink information by using a first sTTI in the first subframe of the secondary component carrier, where the first subframe includes an sTTI that occupies two OFDM symbols and an sTTI that occupies three OFDM symbols; and correspondingly, the receiving unit 1202 is configured to receive, by using a second sTTI of the primary component carrier, the feedback information for the downlink information sent by the sending unit 1201, where a timing relationship exists between the second sTTI and the first sTTI.

Optionally, in an embodiment, the sending unit 1201 is configured to: when the secondary component carrier is the TDD carrier, the primary component carrier is the FDD carrier, each subframe of the secondary component carrier is the first subframe, the first subframe includes an sTTI that occupies two OFDM symbols and an sTTI that occupies three OFDM symbols, and each subframe of the primary component carrier includes the sTTI that occupies two OFDM symbols and the sTTI that occupies three OFDM symbols, send the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M; and correspondingly, the receiving unit 1002 is configured to receive, by using an $sTTI_m$ in an uplink subframe of the primary component carrier, the feedback information for the downlink information sent by the sending unit 1201, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the FDD carrier.

Optionally, in an embodiment, the sending unit 1201 is configured to: when the primary component carrier is the TDD carrier, and the secondary component carrier is the FDD carrier, send downlink information by using a first sTTI of the secondary component carrier; and correspondingly, the receiving unit 1202 is configured to receive, by using a second sTTI in the first subframe of the primary component carrier, the feedback information for the downlink information sent by the sending unit 1201, where the first subframe includes an sTTI that occupies two OFDM symbols and an sTTI that occupies three OFDM symbols, and a timing relationship exists between the first sTTI and the second sTTI.

Optionally, in an embodiment, the sending unit 1201 is configured to: when the primary component carrier is the TDD carrier, the secondary component carrier is the FDD carrier, when each subframe of the primary component carrier is the first subframe, and each subframe of the secondary component carrier includes an sTTI that occupies two OFDM symbols and an sTTI that occupies three OFDM symbols, send the downlink information by using an $sTTI_n$ in a downlink subframe of the secondary component carrier, where the $sTTI_n$ indicates an sTTI whose index marker is n, and the $sTTI_n$ is an sTTI ranked in an $n^{th}$ place based on a time sequence in N sTTIs included in M consecutive subframes in the carrier aggregation system, where M is an integer greater than 0, and N is an integer greater than M; and correspondingly, the receiving unit 1202 is configured to receive, by using an $sTTI_m$ in an uplink subframe of the primary component carrier, the feedback information for the downlink information sent by the sending unit, where the $sTTI_m$ indicates an sTTI whose index marker is m, the $sTTI_m$ is an sTTI ranked in an $m^{th}$ place based on the time sequence in N sTTIs included in M consecutive subframes in the carrier aggregation system, and a value of m is the same as a corresponding index value of an sTTI that is used for transmission of the feedback information when the downlink information is delivered by using the $sTTI_n$ in the downlink subframe of the primary component carrier.

It would be appreciated that the sending unit 1201 and the receiving unit 1202 in this embodiment of this application may be implemented by a transceiver or a transceiver-related circuit component.

Figure 13:
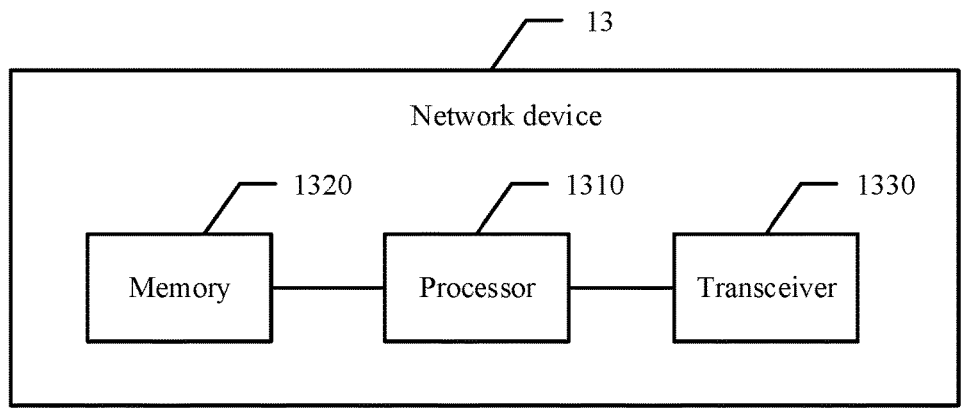
FIG. 13 is a schematic diagram of another embodiment of a network device according to an embodiment of this application.

As shown in FIG. 13, an embodiment of this application further provides a network device 13. The network device 13 includes a processor 1310, a memory 1320, and a transceiver 1330. The memory 1320 stores instructions or a program, and the processor 1310 is configured to execute the instructions or the program stored in the memory 1320. When the instructions or program stored in the memory 1320 is executed, the transceiver 1330 is configured to perform the operations performed by the sending unit 1201 and the receiving unit 1202 in the foregoing embodiment.

It would be appreciated that the network device 12 or the network device 13 according to the embodiments of this application may correspond to the network device in the communication method for the carrier aggregation system in the embodiments of this application, and operations or functions of the modules in the network device 12 or the network device 13 are respectively for implementing corresponding procedures of each method in FIG. 2 to FIG. 9. For brevity, details are not described herein again.

An embodiment of this application further provides a computer-readable storage medium. The computer-readable storage medium stores a computer program. When the program is executed by a processor, a procedure related to the terminal device in the communication method for the carrier aggregation system provided in the foregoing method embodiments may be implemented.

An embodiment of this application further provides a computer-readable storage medium. The computer-readable storage medium stores a computer program. When the program is executed by a processor, a procedure related to the network device in the communication method for the carrier aggregation system provided in the foregoing method embodiments may be implemented.

An embodiment of this application further provides a communication device, and the communication device may be a terminal device or a circuit. The communication device may be configured to perform an action performed by the terminal device in the foregoing method embodiments.

Figure 14:
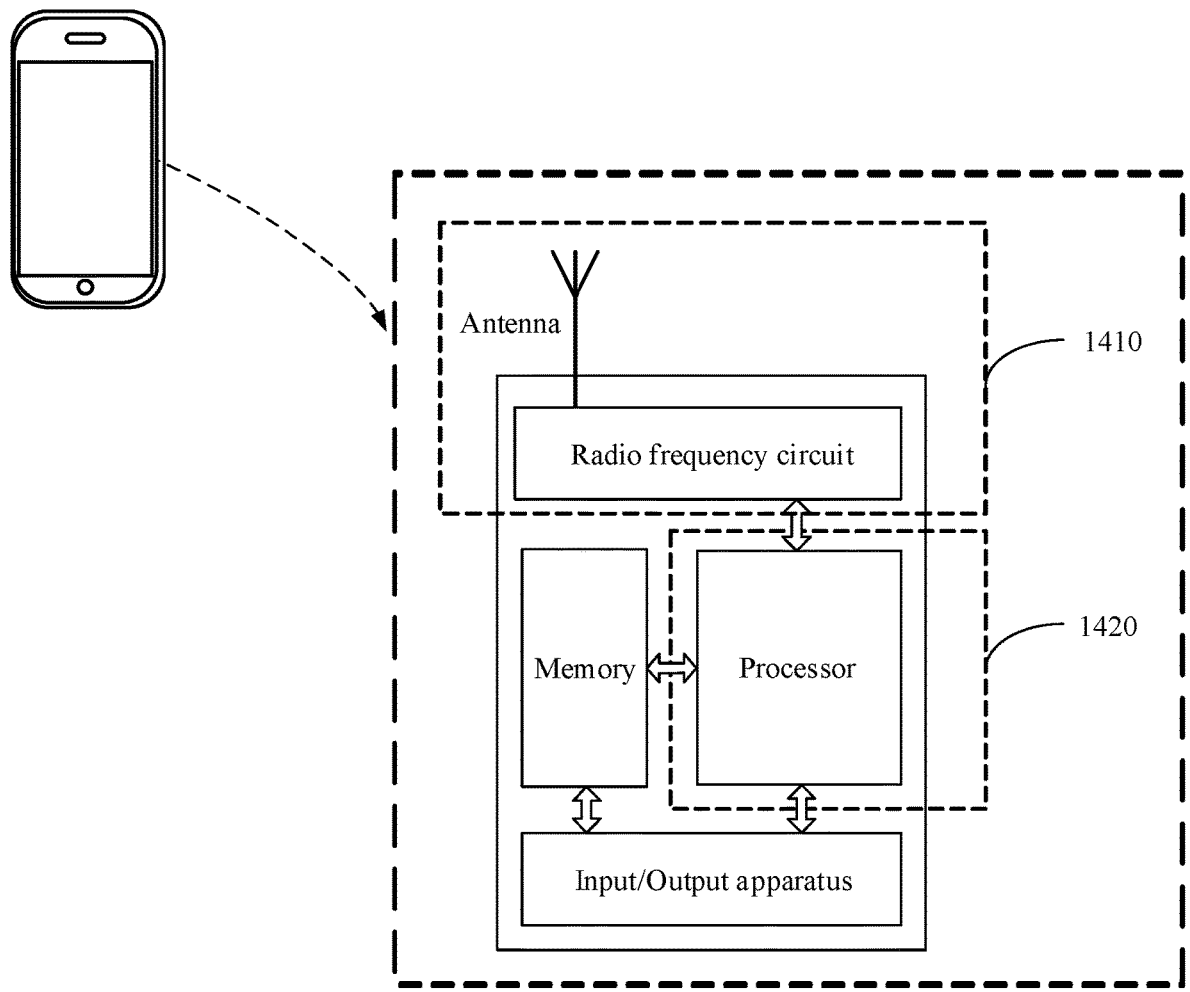
FIG. 14 is a schematic diagram of another embodiment of a communication device according to an embodiment of this application.

When the communication device is a terminal device, FIG. 14 is a simplified schematic structural diagram of a terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus such as a touchscreen, a display, or a keyboard is mainly configured to: receive data entered by a user, and output data to the user. It would be appreciated that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal by using the antenna in an electromagnetic wave form. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data. For ease of description, FIG. 14 shows one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 14, the terminal device includes the transceiver unit 1410 and the processing unit 1420. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like. It would be appreciated that the transceiver unit 1410 is configured to perform a sending operation and a receiving operation on a terminal device side in the foregoing method embodiments.

When the communication device is a chip, the chip includes a transceiver unit and a processing unit. The transceiver unit may be an input/output circuit or a communication interface. The processing unit is a processor, a microprocessor, or an integrated circuit integrated on the chip.

Figure 15:
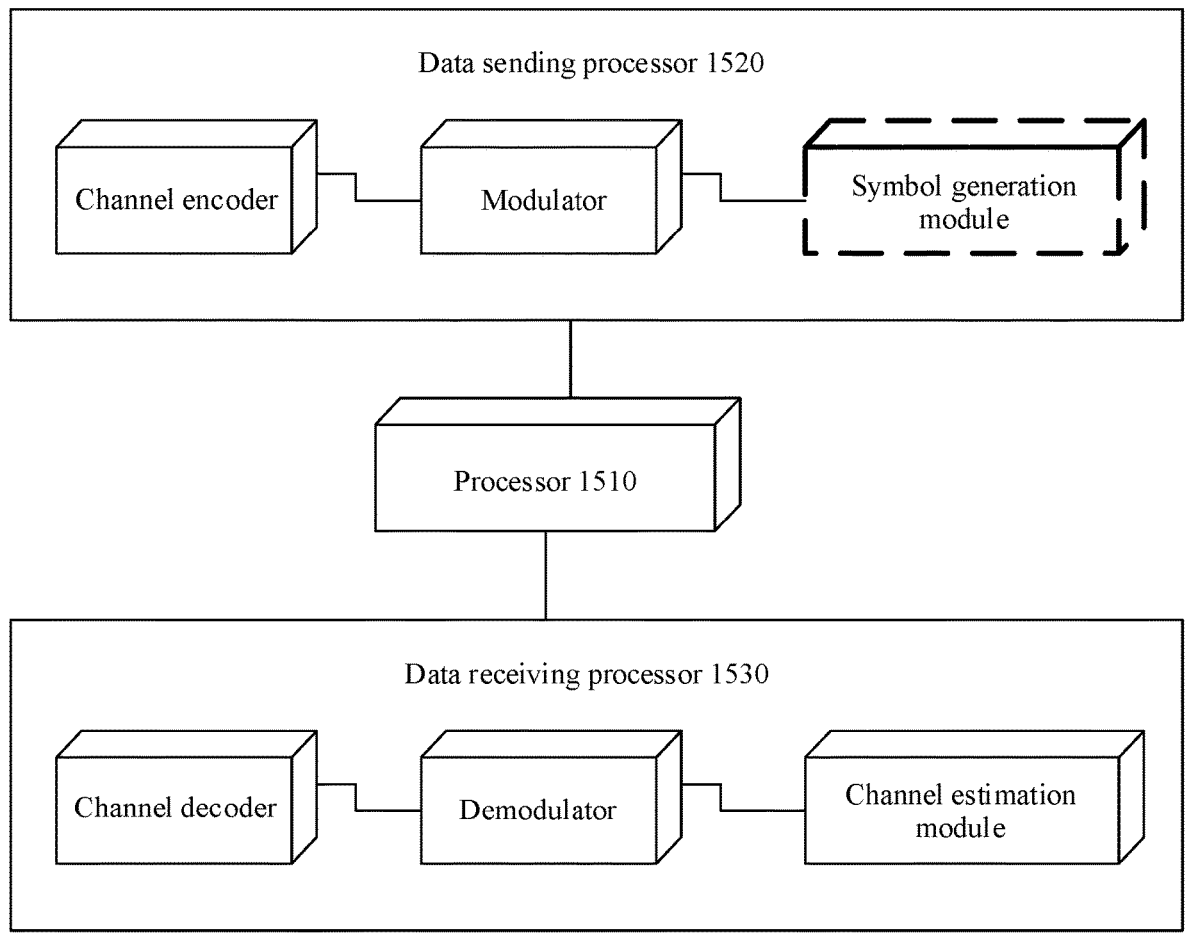
FIG. 15 is a schematic diagram of another embodiment of a communication device according to an embodiment of this application.

When the communication device in this embodiment is a terminal device, details are described according to a device shown in FIG. 15. In an example, the device can implement a function similar to a function of the processor 1110 in FIG. 11. In FIG. 15, the device includes a processor 1510, a data sending processor 1520, and a data receiving processor 1530. The receiving unit 1001 and the sending unit 1002 in the foregoing embodiment as shown in FIG. 10 may be the data receiving processor 1530 and the data sending processor 1520 in FIG. 15. Although FIG. 15 shows a channel encoder and a channel decoder, it may be understood that these modules are merely examples, and do not constitute limitative description of this embodiment.

Figure 16:
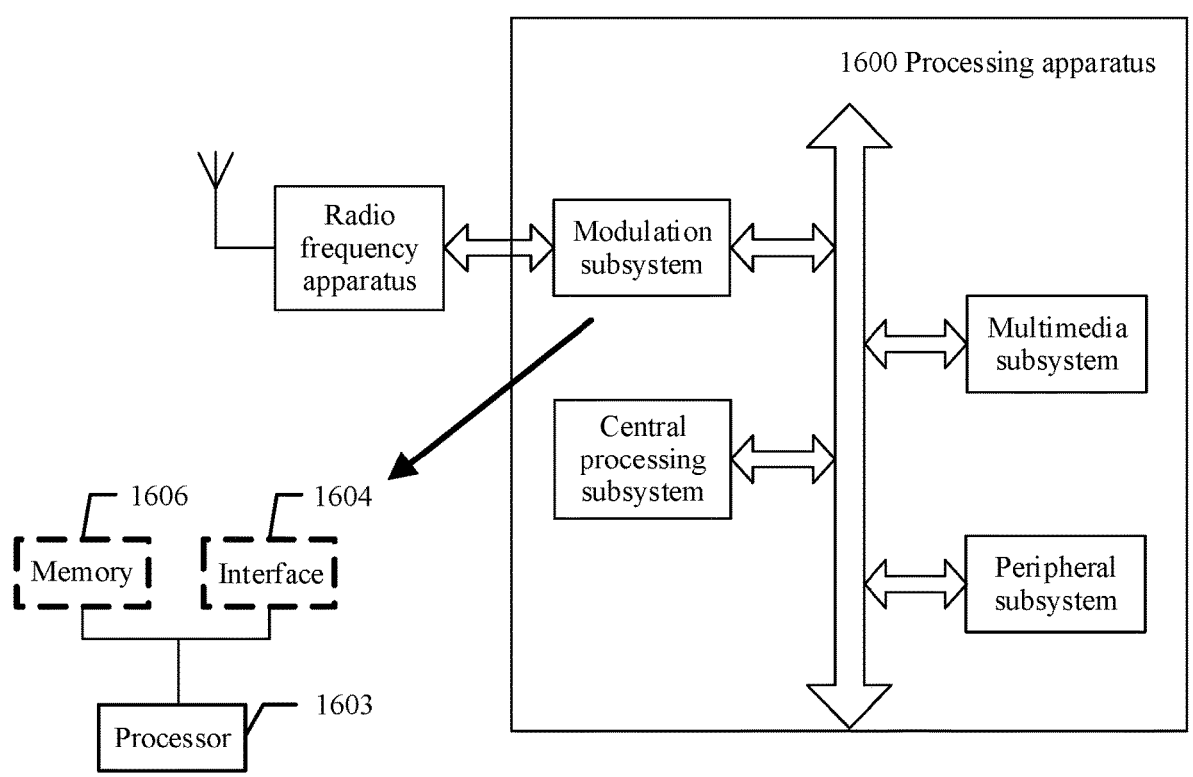
FIG. 16 is a schematic diagram of another embodiment of a communication device according to an embodiment of this application.

FIG. 16 shows another form of this embodiment. A processing apparatus 1600 includes modules such as a modulation subsystem, a central processing subsystem, and a peripheral subsystem. The communication device in this embodiment may be used as the modulation subsystem in the processing apparatus 1600. Specifically, the modulation subsystem may include a processor 1603 and an interface 1604. The processor 1603 completes a function of the processor 1110 as shown in FIG. 11, and the interface 1604 completes a function of the transceiver 1130 as shown in FIG. 11. In another variation, the modulation subsystem includes a memory 1606, a processor 1603, and a program that is stored in the memory 1606 and that can be run on the processor. When executing the program, the processor 1603 implements the method on the terminal device side in the foregoing method embodiments. It would be appreciated that the memory 1606 may be nonvolatile or volatile. The memory 1606 may be located in the modulation subsystem, or may be located in the processing apparatus 1600, provided that the memory 1606 can be connected to the processor 1603.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product that includes instructions is provided. When the instructions are executed, the method on the terminal device side in the foregoing method embodiments is performed.

Figure 17:
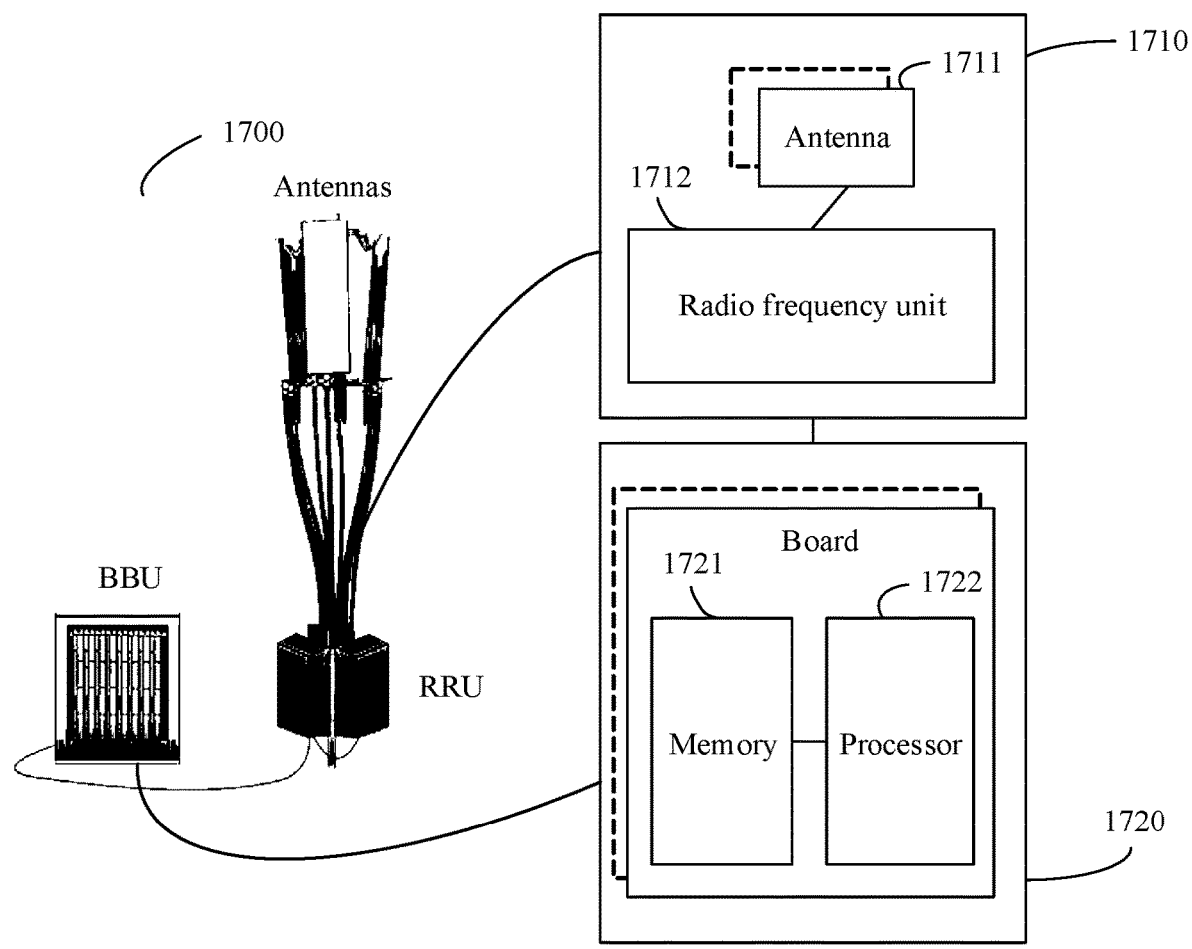
FIG. 17 is a schematic diagram of another embodiment of a network device according to an embodiment of this application.

The network device in the embodiments of this application may be the network device 1700 shown in FIG. 17, and the network device 1700 includes one or more radio frequency units, such as a remote radio unit (RRU) 1710, and one or more baseband units (BBU) (which may also be referred to as a digital unit (DU) 1720. The RRU 1710 may be referred to as a transceiver unit, and corresponds to the transceiver 1330 in FIG. 13. Optionally, the transceiver unit may also be referred to as a transceiver machine, a transceiver circuit, a transceiver, or the like, and may include at least one antenna 1711 and a radio frequency unit 1712. The RRU 1710 part is mainly configured to: receive and send a radio frequency signal, and perform conversion between the radio frequency signal and a baseband signal. For example, the RRU 1710 is configured to send indication information to a terminal device. The BBU 1720 part is mainly configured to: perform baseband processing, control the base station, and the like. The RRU 1710 and the BBU 1720 may be physically disposed together, or may be physically separated, that is, in a distributed base station. The BBU 1720 is a control center of the base station, or may be referred to as a processing unit. The BBU 1720 may correspond to the processor 1310 in FIG. 13, and is mainly configured to implement a baseband processing function, for example, channel coding, multiplexing, modulation, or spreading. For example, the BBU (processing module) may be configured to control the base station to perform an operation procedure related to the network device in the foregoing method embodiments, for example, generate the foregoing indication information.

In an example, the BBU 1720 may include one or more boards, and a plurality of boards may jointly support a radio access network (such as an LTE network) of a single access standard, or may separately support radio access networks (such as an LTE network, a 5G network, or another network) of different access standards. The BBU 1720 further includes a memory 1721 and a processor 1722. The memory 1721 is configured to store an instruction and data. The processor 1722 is configured to control the base station to perform an action, for example, control the base station to perform the operation procedure related to the network device in the foregoing method embodiments. The memory 1721 and the processor 1722 may serve one or more boards. In other words, a memory and a processor may be independently disposed on each board. Alternatively, a plurality of boards may share a same memory and a same processor. In addition, a circuit may be further disposed on each board.

It would be appreciated that, the processor mentioned in the embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It may be understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It would be appreciated that when the processor is a general-purpose processor, a DSP, an ASIC, an FPGA or another programmable logic device, a discrete gate or a transistor logic device, or a discrete hardware component, the memory (a storage module) is integrated into the processor.

It would be appreciated that the memory described in this specification aims to include but is not limited to these memories and any memory of another proper type.

It would be appreciated that, the character "I" in this specification usually represents an "or" relationship between the associated objects.

It would be appreciated that, in the embodiments of this application, sequence numbers of the foregoing processes do not mean execution sequences. The execution sequences of the processes should be determined based on functions and internal logic of the processes, and should not constitute any limitation to implementation processes of the embodiments of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, a detailed working process of the foregoing system, apparatus, and unit has been described according to a corresponding process in the foregoing method embodiments, and details are not described herein again.

In the several embodiments provided in this application, it would be appreciated that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may have an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of a solution in this embodiment.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: various mediums that can store program code, such as a USB flash drive, a removable hard disk, a read-only memory (ROM), a random access memory (RAM), a magnetic disk, and an optical disc.

The foregoing describes in detail the communication method for the carrier aggregation system, the communication device, the network device, and the communication system that are provided in the embodiments of the present disclosure. In this specification, specific examples are used to describe the principle and implementations of the present disclosure. The foregoing descriptions of the embodiments are merely used to help understand the method and core ideas of the present disclosure. In addition, a person of ordinary skill in the art can make variations and modifications in terms of the specific implementations and application scopes according to the ideas of the present disclosure. In conclusion, the content of this specification shall not be construed as a limitation to the present disclosure.

What is claimed is:

1. A communication apparatus, comprising:
at least one processor, and
one or more memories coupled to the at least one processor and storing programming instructions thereon, which when executed by the at least one processor, cause the communication apparatus to perform operations comprising:
receiving downlink information by using a secondary component carrier;
sending feedback information for the downlink information by using a primary component carrier, wherein based on the primary component carrier or the secondary component carrier being a time division duplex (TDD) carrier in a carrier aggregation system and the carrier aggregation system comprising the TDD carrier and a frequency division duplex (FDD) carrier, at least one first subframe exists in the TDD carrier, wherein the first subframe comprises P consecutive short transmission time intervals (sTTIs), and at least one sTTI that occupies two orthogonal frequency division multiplexing (OFDM) symbols exists in the P consecutive sTTIs, wherein P is an integer greater than 1, and wherein the first subframe comprises an sTTI that occupies two OFDM symbols and an sTTI that occupies three OFDM symbols; and
based on the secondary component carrier being the TDD carrier and the primary component carrier being the FDD carrier, the receiving downlink information by using the secondary component carrier comprises:
receiving the downlink information by using a first sTTI in the first subframe of the secondary component carrier, wherein the first sTTI is one of the P consecutive sTTIs, and wherein the sending feedback information for the downlink information by using a primary component carrier comprises:
sending the feedback information for the downlink information by using a second sTTI of the primary component carrier, wherein a timing relationship exists between the second sTTI and the first sTTI.

2. The communication apparatus according to claim 1, wherein based on each subframe of the secondary component carrier being the first subframe, and each subframe of the primary component carrier comprising an sTTI that occupies two OFDM symbols and an sTTI that occupies three OFDM symbols, the receiving the downlink information by using a first sTTI in the first subframe of the secondary component carrier comprises:
receiving the downlink information by using an $sTTI_n$ in a downlink subframe of the secondary component carrier, wherein the $sTTI_n$ indicates an sTTI whose index marker is n, and the $sTTI_n$ is an sTTI ranked in an $n^{th}$ place based on a time sequence in N sTTIs within M consecutive subframes in the carrier aggregation system, wherein M is an integer greater than and N is an integer greater than M; and
wherein the sending the feedback information for the downlink information by using a second sTTI of the primary component carrier comprises:
sending the feedback information for the downlink information by using an $sTTI_m$ in an uplink subframe of the primary component carrier, wherein the $sTTI_m$ indicates an sTTI whose index marker is m, the $sTTI_m$ is an sTTI ranked in an $m^{th}$ place based on the time sequence in N sTTIs within M consecutive subframes in the carrier aggregation system, and a value of m is the same as a corresponding index value of an sTTI that is used for transmission of the feedback information in a condition where the downlink information is delivered by using the $sTTI_n$ in the downlink subframe of the primary component carrier.

3. The communication apparatus according to claim 2, wherein m=n+4.

4. The communication apparatus according to claim 1, wherein based on the primary component carrier being the TDD carrier and the secondary component carrier being the FDD carrier, the receiving downlink information by using a secondary component carrier comprises:
receiving the downlink information by using a first sTTI of the secondary component carrier; and
wherein the sending feedback information for the downlink information by using a primary component carrier comprises:
sending the feedback information for the downlink information by using a second sTTI in the first subframe of the primary component carrier, wherein the second sTTI is one of the P consecutive sTTIs, and a timing relationship exists between the first sTTI and the second sTTI.

5. The communication apparatus according to claim 4, wherein based on each subframe of the primary component carrier being the first subframe, and each subframe of the secondary component carrier comprising an sTTI that occupies two OFDM symbols and an sTTI that occupies three OFDM symbols, the receiving the downlink information by using a first sTTI of the secondary component carrier comprises:
receiving the downlink information by using an $sTTI_n$ in a downlink subframe of the secondary component carrier, wherein the $sTTI_n$ indicates an sTTI whose index marker is n, and the $sTTI_n$ is an sTTI ranked in an $n^{th}$ place based on a time sequence in N sTTIs within M consecutive subframes in the carrier aggregation system, wherein M is an integer greater than 0, and N is an integer greater than M; and
wherein the sending the feedback information for the downlink information by using a second sTTI in the first subframe of the primary component carrier comprises:
sending the feedback information for the downlink information by using an $sTTI_m$ in an uplink subframe of the primary component carrier, wherein the $sTTI_m$ indicates an sTTI whose index marker is m, the $sTTI_m$ is an sTTI ranked in an $m^{th}$ place based on the time sequence in N sTTIs within M consecutive subframes in the carrier aggregation system, and a value of m is the same as a corresponding index value of an sTTI that is used for transmission of the feedback information in a condition where the downlink information is delivered by using the $sTTI_n$ in the downlink subframe of the primary component carrier.

6. The communication apparatus according to claim 5, wherein m=n+k, and k is an integer greater than 3.

7. The communication apparatus according to claim 1, wherein in response to the first subframe being a downlink subframe, and a quantity of OFDM symbols occupied by a physical downlink control channel (PDCCH) is 3, quantities of OFDM symbols occupied by a first sTTI to a last sTTI within the first subframe are sequentially 3, 2, 2, 2, 2, and 3.

8. The communication apparatus according to claim 1, wherein in response to the first subframe being an uplink subframe, quantities of OFDM symbols occupied by a first sTTI to a last sTTI within the first subframe are sequentially 3, 2, 2, 2, 2, and 3.

9. A communication apparatus, comprising:
at least one processor, and
one or more memories coupled to the at least one processor and storing programming instructions thereon, which when executed by the at least one processor, cause the communication apparatus to perform operations comprising:
sending downlink information by using a secondary component carrier; and
receiving feedback information for the downlink information by using a primary component carrier, wherein based on the primary component carrier or the secondary component carrier being a time division duplex (TDD) carrier in a carrier aggregation system and the carrier aggregation system comprising the TDD carrier and a frequency division duplex (FDD) carrier, at least one first subframe exists in the TDD carrier, wherein the first subframe comprises P consecutive short transmission time intervals (sTTIs), and at least one sTTI that occupies two orthogonal frequency division multiplexing (OFDM) symbols exists in the P consecutive sTTIs, wherein P is an integer greater than 1, wherein the first subframe comprises an sTTI that occupies two OFDM symbols and an sTTI that occupies three OFDM symbols; and
based on the secondary component carrier being the TDD carrier and the primary component carrier being the FDD carrier, the sending downlink information by using the secondary component carrier comprises:
sending the downlink information by using a first sTTI in the first subframe of the secondary component carrier, wherein the first sTTI is one of the P consecutive sTTIs, and wherein the receiving feedback information for the downlink information by using a primary component carrier comprises:
receiving the feedback information for the downlink information by using a second sTTI of the primary component carrier, wherein a timing relationship exists between the second sTTI and the first sTTI.

10. The communication apparatus according to claim 9, wherein based on each subframe of the secondary component carrier being the first subframe, and each subframe of the primary component carrier comprising an sTTI that occupies two OFDM symbols and an sTTI that occupies three OFDM symbols, the sending the downlink information by using a first sTTI in the first subframe of the secondary component carrier comprises:
sending the downlink information by using an $sTTI_n$ in a downlink subframe of the secondary component carrier, wherein the $sTTI_n$ indicates an sTTI whose index marker is n, and the $sTTI_n$ is an sTTI ranked in an $n^{th}$ place based on a time sequence in N sTTIs within M consecutive subframes in the carrier aggregation system, wherein M is an integer greater than and N is an integer greater than M; and
wherein the receiving the feedback information for the downlink information by using a second sTTI of the primary component carrier comprises:
receiving the feedback information for the downlink information by using an $sTTI_m$ in an uplink subframe of the primary component carrier, wherein the $sTTI_m$ indicates an sTTI whose index marker is m, the $sTTI_m$ is an sTTI ranked in an $m^{th}$ place based on the time sequence in N sTTIs within M consecutive subframes in the carrier aggregation system, and a value of m is the same as a corresponding index value of an sTTI that is used for transmission of the feedback information in a condition where the downlink information is delivered by using the $sTTI_n$ in the downlink subframe of the primary component carrier.

11. The communication apparatus according to claim 10, wherein m=n+4.

12. The communication apparatus according to claim 9, wherein based on the primary component carrier being the TDD carrier and the secondary component carrier being the FDD carrier, the sending downlink information by using a secondary component carrier comprises:
sending the downlink information by using a first sTTI of the secondary component carrier; and
wherein the receiving feedback information for the downlink information by using a primary component carrier comprises:
receiving the feedback information for the downlink information by using a second sTTI in the first subframe of the primary component carrier, wherein the second sTTI is one of the P consecutive sTTIs, a timing relationship exists between the first sTTI and the second sTTI.

13. The communication apparatus according to claim 12, wherein based on each subframe of the primary component carrier being the first subframe, and each subframe of the secondary component carrier comprising an sTTI that occupies two OFDM symbols and an sTTI that occupies three OFDM symbols, the sending the downlink information by using a first sTTI of the secondary component carrier comprises:
sending the downlink information by using an $sTTI_n$ in a downlink subframe of the secondary component carrier, wherein the $sTTI_n$ indicates an sTTI whose index marker is n, and the $sTTI_n$ is an sTTI ranked in an $n^{th}$ place based on a time sequence in N sTTIs within M consecutive subframes in the carrier aggregation system, wherein M is an integer greater than 0, and N is an integer greater than M; and
wherein the receiving the feedback information for the downlink information by using a second sTTI in the first subframe of the primary component carrier comprises:
receiving the feedback information for the downlink information by using an $sTTI_m$ in an uplink subframe of the primary component carrier, wherein the $sTTI_m$ indicates an sTTI whose index marker is m, the $sTTI_m$ is an sTTI ranked in an $m^{th}$ place based on the time sequence in N sTTIs within M consecutive subframes in the carrier aggregation system, and a value of m is the same as a corresponding index value of an sTTI that is used for transmission of the feedback information in a condition where the downlink information is delivered by using the $sTTI_n$ in the downlink subframe of the primary component carrier.

14. The communication apparatus according to claim 13, wherein m=n+k, and k is an integer greater than 3.

15. The communication apparatus according to claim 9, wherein in response to the first subframe being a downlink subframe, and a quantity of OFDM symbols occupied by a physical downlink control channel (PDCCH) is 3, quantities of OFDM symbols occupied by a first sTTI to a last sTTI within the first subframe are sequentially 3, 2, 2, 2, 2, and 3.

16. The communication apparatus according to claim 9, wherein in response to the first subframe being an uplink subframe, quantities of OFDM symbols occupied by a first sTTI to a last sTTI within the first subframe are sequentially 3, 2, 2, 2, 2, and 3.

* * * * *